United States Patent [19]

Coleman et al.

[11] Patent Number: 5,486,358
[45] Date of Patent: Jan. 23, 1996

[54] AZLACTONE-FUNCTIONAL POLYMER BLENDS, ARTICLES PRODUCED THEREFROM AND METHODS FOR PREPARING BOTH

[75] Inventors: Patrick L. Coleman, Minneapolis; Steven M. Heilmann, Afton; Steven L. Kangas, Woodbury; Jerald K. Rasmussen, May Township, Washington County; Richard J. Rolando, Oakdale; Julie B. Stahl, St. Paul, all of Minn.

[73] Assignee: Minnesota Mining and Manufacturing Company, St. Paul, Minn.

[21] Appl. No.: 415,730

[22] Filed: Apr. 3, 1995

Related U.S. Application Data

[62] Division of Ser. No. 119,036, Sep. 9, 1993, Pat. No. 5,408,002.

[51] Int. Cl.$^6$ .......................... C08L 39/04; A61K 47/32; B32B 27/30

[52] U.S. Cl. .................. 424/78.23; 424/78.18; 424/78.19; 424/1.65; 424/94.1; 424/94.3; 424/94.5; 424/94.61; 424/184.1; 525/54.1; 525/54.11; 525/194; 525/326.8; 428/476.6; 428/522

[58] Field of Search ................ 424/78.23, 78.18, 424/78.19, 1.65, 94.1, 94.3, 94.5, 94.61, 184.1; 525/54.1, 54.11, 194, 326.8; 428/476.6, 522

[56] References Cited

U.S. PATENT DOCUMENTS

| | | | |
|---|---|---|---|
| 3,928,255 | 12/1975 | Milkovich et al. | 260/2.5 R |
| 4,291,152 | 9/1981 | Inata et al. | 528/289 |
| 4,304,705 | 12/1981 | Heilmann et al. | 260/30.4 N |
| 4,378,411 | 3/1983 | Heilmann et al. | 428/500 |
| 4,485,236 | 11/1984 | Rasmussen et al. | 544/69 |
| 4,695,608 | 9/1987 | Engler et al. | 525/308 |
| 4,855,184 | 8/1989 | Klun et al. | 428/425.1 |
| 4,871,824 | 10/1989 | Heilmann et al. | 526/304 |
| 4,902,749 | 2/1990 | Akkapeddi et al. | 525/66 |
| 5,013,795 | 5/1991 | Coleman et al. | 525/279 |
| 5,081,197 | 1/1992 | Heilmann et al. | 526/260 |
| 5,091,489 | 2/1992 | Heilmann et al. | 526/90 |
| 5,149,806 | 9/1992 | Moren et al. | 544/72 |
| 5,175,081 | 12/1992 | Krepski et al. | 430/617 |
| 5,200,471 | 4/1993 | Coleman et al. | 525/326.9 |
| 5,262,484 | 11/1993 | Coleman et al. | 525/204 |
| 5,264,278 | 11/1993 | Mazurek et al. | 428/317.3 |
| 5,292,514 | 3/1994 | Capecchi et al. | 424/422 |
| 5,292,840 | 3/1994 | Heilmann et al. | 526/304 |
| 5,344,701 | 9/1994 | Gagnon et al. | 428/304.4 |

FOREIGN PATENT DOCUMENTS

| | | |
|---|---|---|
| 0392735 | 10/1990 | European Pat. Off. . |
| 0392783 | 10/1990 | European Pat. Off. . |
| 64-81876 | 3/1989 | Japan . |
| 077507 | 3/1992 | Japan . |
| 4-159310 | 6/1992 | Japan . |
| WO 94/06803 | 8/1994 | WIPO . |

OTHER PUBLICATIONS

American Chemical Society Publication of Japanese Kokai 92,159.

Almog et al., *The British Polymer Journal*, 14(4) 131 (Dec. 1982).

Edelman et al., *Proc. Nat. Acad. Sci. USA*, 68, 2153 (Sep. 1971).

Rasmussen et al,. "Polyazactones", *Encyclopedia of Polymer Science sand Engineering*, vol. 11, 2nd Ed., pp. 558–571 (1980).

Taylor, L. D., "Synthesis and Polymerization of 2-Vinyl-4,4-Dimethyl-5-Oxazolone", *Journal of Polymer Science Part B*, vol. 9, pp. 187–190 (1971).

*Primary Examiner*—David Buttner
*Attorney, Agent, or Firm*—Gary L. Griswold; Walter N. Kirn; John H. Hornickel

[57] ABSTRACT

An azlactone-functional thermoplastic composition is disclosed, The composition is a blend of an azlactone-functional composition and a thermoplastic polymer. A method of making azlactone-functional homopolymers by bulk homopolymerization is disclosed, optionally also concurrent or sequential blending of a thermoplastic polymer. A method of blending azlactone-functional compositions and thermoplastic polymers is disclosed. Molded articles coupled with biologically active substances are claimed.

5 Claims, 1 Drawing Sheet

AZLACTONE-FUNCTIONAL POLYMER BLENDS, ARTICLES PRODUCED THEREFROM AND METHODS FOR PREPARING BOTH

This is a division of Application No. 08/119,036 filed Sep. 9, 1993, now U.S. Pat. No. 5,408,002.

FIELD OF THE INVENTION

This invention relates to polymer blends having azlactone-functional surfaces, useful articles formed from such blends, and methods to prepare the blends and the articles.

BACKGROUND OF THE INVENTION

European Patent Publication 0 392 783 (Coleman et al.) describes efforts to obtain azlactone graft copolymers via functionalization of a poly-alpha-olefin base polymer by grafting a monomeric 2-alkenyl azlactone using reactive extrusion processing. Compatibilized blends and blends with base polymer are also disclosed.

Many desirable and useful graft copolymers result from this method. But there is an upper temperature limit of about 200° C. in the grafting process because monomeric 2-alkenyl azlactones are volatile. The reactive extrusion temperature range limits the types of base polymer candidates for reactive extrusion. For example, nylon 6 and certain polyurethanes are not suitable candidates for reactive extrusion according to the method of Coleman et al.

Another difficulty with graft copolymers prepared by reactive extrusion is the uncertainty of products and byproducts of the reactive extrusion process. Uncertain products can include degraded or crosslinked base polymer, homopolymer of the graft comonomer, and uncertain grafting configurations on the desired graft copolymer product. The presence of unreacted monomer is deleterious to performance of the resulting product, particularly when the resulting product is used for an article prepared by injection molding. Also, depending on the type of free radical initiator employed in the reactive extrusion process, crosslinking of thermoplastic polymer can occur that would otherwise deleteriously affect use of the graft copolymer for further processing.

One purpose of preparing azlactone-functional graft copolymers is to provide azlactone-functional surfaces for subsequent reaction with nucleophilic groups, including biologically active substances. One method of providing azlactone-functional surfaces is to functionalize pre-existing surfaces of an article. But such methods are limited by the complexity of the process and the ability of the treatment to affect such pre-existing surfaces.

An example of chemical treatment of a pre-existing surface to impart functionality is disclosed in Edelman et al., *Proc. Nat. Acad. Sci. USA* 68, 2153 (1971), which describes how to functionalize nylon monofilament fibers using 3N HCl to partially hydrolyze the fibers before protein could be coupled using a water-soluble carbodiimide. Partial hydrolysis can weaken the physical properties of the polymer, such as strength, flexibility, resiliency to stretching, etc.

An English language abstract of Japanese Kokai 92,159 published by the American Chemical Society discloses the use of azlactones as compatibilizers in a blend of nylon and polycarbonate polymers.

U.S. Pat. No. 4,695,608 (Engler et al.) discloses the bulk polymerization of vinyl monomers and alkenyl azlactones using free radical polymerization techniques.

SUMMARY OF THE INVENTION

The invention overcomes processing limitations associated with using processes that rely on the bulk copolymerization of monomeric 2-alkenyl azlactones that can result in uncertain byproducts and unreacted monomers.

The invention provides the melt blending of azlactone-functional compositions, especially homopolymers, with thermoplastic polymers. When azlactone-functional copolymers are melt blended with thermoplastic polymers, a two phase, incompatible blended product usually results. However, this incompatibility does not have deleterious effects of an uncompatibilized product due to the ability of azlactone-functionality to react with desired nucleophilic ligands.

This invention also provides a method of extrusion bulk polymerization of azlactone-functional monomers and the blending of their resultant homopolymers with thermoplastic polymers in a single step or in sequential steps.

Because the melt blending process is non-reactive for the thermoplastic polymer so blended, the chemical properties of the thermoplastic polymer are substantially unaltered.

Because the melt blending process can be used for molding operations, azlactone-functional articles can be prepared in any desired shape or exhibiting any desired surface contour. Azlactone-functional surfaces of the articles can be available for covalent reaction with nucleophilic groups, including biologically active substances, regardless of the shape or surface contour of the article so formed.

Azlactone-functional homopolymers or copolymers are capable of being melt processed above 200° C., unlike monomeric azlactones. Thus, thermoplastic polymer candidates need not be limited to polymers which can be melt processed below 200° C. Nylon 6 and certain polyurethanes, among others, are now available for melt processing to make azlactone-functional articles.

Melt blending and molding processes are advantageous over other means of surface modification because these processes avoid intermediate chemical activation of a surface required by standard chemical means of surface modification.

One aspect of this invention is a method of melt blending a thermoplastic polymer with an azlactone-functional composition.

Another aspect of this invention is a method of bulk homopolymerizing 2-alkenyl azlactones in a solventless and continuous process with little unreacted monomer remaining in the bulk homopolymer so formed.

Another aspect of this invention is a method of melt blending the bulk homopolymerized 2-alkenyl azlactones with thermoplastic polymers. The method of melt blending can occur in a single step with bulk polymerization or can occur in a sequential step after bulk polymerization.

Another aspect of this invention is an article produced from the melt blending of a thermoplastic polymer with an azlactone-functional polymer.

For purposes of this invention, the following definitions apply.

"Azlactone" means an oxazolinone moiety of Formula I:

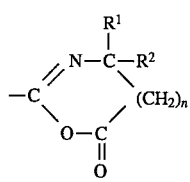

wherein $R^1$ and $R^2$ independently can be an alkyl group having 1 to 14 carbon atoms, a cycloalkyl group having 3 to 14 carbon atoms, an aryl group having 5 to 12 ring atoms, an arenyl group having 6 to 26 carbon atoms and 0 to 3 S, N, and nonperoxidic O heteroatoms, or $R^1$ and $R^2$ taken together with the carbon to which they are joined can form a carbocyclic ring containing 4 to 12 ring atoms, and n is an integer 0 or 1.

"Azlactone-functional" means an least one azlactone moiety of Formula I is present at a surface of a polymeric composition, such that at least one azlactone moiety remains available for further nucleophilic reaction, especially with a biologically active substance.

"Azlactone-functional composition" means a compound containing or comprising at least one azlactone moiety of Formula I above. It is within the scope of the invention to melt blend more than one azlactone-functional composition with a thermoplastic polymer according to the methods of the present invention. Therefore, reference to azlactone-functional composition should be deemed to include one or more azlactone-functional compositions as desired for end-use properties.

"Biologically active substance" means a chemical composition having azlactone-reactive, nucleophilic-functional groups and capable of reacting in a manner which affects biological processes, especially mammalian cells. Nonlimiting examples of biologically active substances are substances which are biologically, immunochemically, physiologically, or pharmaceutically active.

"Thermoplastic polymer" means a polymer which is capable of being melt blended at temperatures between about 50° C. and about 350° C. Preferably, the melt blending temperatures can be between 75° C. and 300° C. Most preferably, the melt blending temperature can be between 100° C. and 250° C. It is within the scope of the invention to melt blend more than one thermoplastic polymer with azlactone-functional compositions according to the methods of the present invention. Therefore reference to thermoplastic polymer should be deemed to include one or more thermoplastic polymers as desired for end-use properties. When azlactone copolymers are used as the azlactone-functional composition, a two phase, incompatible blended product can result.

"Surfaces" means both outer surfaces of an article and any applicable interior surfaces forming pores and interstices within a porous article.

A feature of the present invention is the ability to render the surface of an article azlactone-functional while retaining the physical properties of the base polymer used to form the article.

An advantage of the present invention is the formation of articles which are azlactone-functional, which are reactive toward nucleophilic groups without intermediate chemical activation of surfaces of the article.

Embodiments of the invention follow a brief description of the drawings.

EMBODIMENTS OF THE INVENTION

Thermoplastic Polymers

Figure 1:
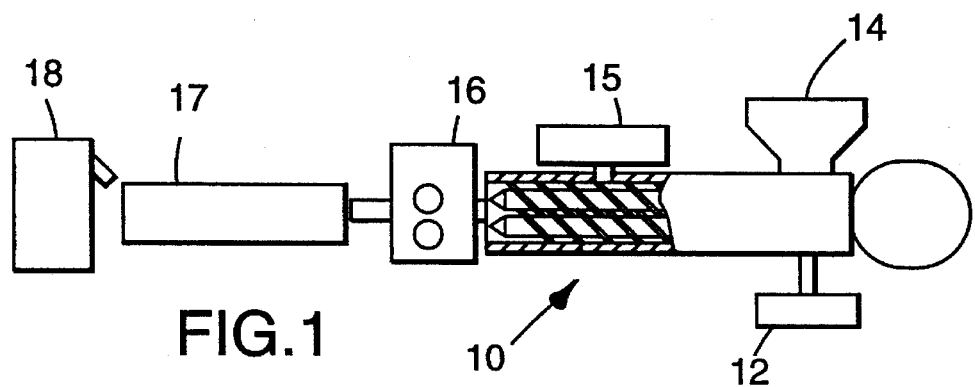
FIG. 1 is a schematic illustration of a twin screw extruder useful in a one-step process of the present invention.

Any thermoplastic polymer that is non-reactive with an azlactone moiety of Formula I above is a candidate for melt blending with azlactone-functional compositions to render surfaces of an article, formed from the thermoplastic polymer, azlactone-functional. Nonlimiting examples of thermoplastic polymers include polyamides (e.g., nylon 6), polyurethanes, polyacrylates, polymethacrylates, polystyrene, polyolefins, ethylene-vinyl acetate copolymers, poly(N-vinyl lactams) (e.g., polyvinylpyrrolidone), polyvinyl acetates, polyoxyalkylenes, styrene-acrylonitrile copolymers, polyphenylene oxides, fluoroelastomers, polycarbonates, polyesters. (Polyvinyl alcohol homopolymers and copolymers are not suitable because the hydroxy groups can react with azlactone.) These thermoplastic polymers can be homopolymers or copolymers. Thermoplastic copolymers can include azlactone-functional copolymers, such as graft copolymers disclosed in U.S. Pat. No. 5,013,795 (Coleman et al.), incorporated by reference herein, and bulk copolymers disclosed in U.S. Pat. No. 4,695,608 (Engler et al.), incorporated by reference herein.

Thermoplastic polymers are readily commercially available from a number of sources. Depending on the thermoplastic polymer to be used and the end-use contemplated for the article, care should be taken to select one or more thermoplastic polymers having the requisite quality and purity.

While thermoplastic polymers can be melt blended at temperatures ranging from about 50° C. to about 350° C., it is preferred to have such thermoplastic polymers be capable of melt blending at ranges from about 75° C. to about 300° C., and more preferably 100° C. to about 300° C.

While articles formed from thermoplastic polymers need not exhibit any specific opacity, translucency, or transparency, some uses of articles can require such physical properties. Of the possible candidates, poly(methylmethacrylate) is preferred because it can provide an optically clear, azlactone-functional blended article, which is particularly useful in medical articles, such as medical tubing and in diagnostic articles, such as microtitration wells and plates.

Azlactone-functional Compositions

Azlactone-functional compositions can be any compound containing or comprising at least one azlactone moiety of Formula I above. Preferably, it is an azlactone-functional polymer or oligomer. Most preferably, it is a homopolymer of an azlactone-containing monomer, preferably 2-alkenyl azlactone.

Azlactone-functional polymers and oligomers are typically prepared by free radical polymerization of azlactone-containing monomers, optionally with co-monomers as described in U.S. Pat. No. 4,378,411 incorporated by reference herein.

Copolymers containing minor portions of azlactone moieties can be prepared by bulk copolymerization with other vinyl monomers as described in U.S. Pat. No. 4,695,608, incorporated by reference herein.

Polymers having azlactone-functional side chains can be prepared by reactive extrusion grafting of azlactone-containing monomers to non-azlactone-containing polymers, using such techniques as disclosed in European Patent Publication 0 392 783 (Coleman et al.), incorporated by reference herein and in U.S. Pat. No. 5,013,795 (Coleman et al), incorporated by reference herein.

Nonlimiting examples of azlactone-functional oligomers and polymers are disclosed in U.S. Pat. No. 5,081,197, and European Patent Publication 0 392 735. Other nonlimiting examples of azlactone-functional compositions and their methods of preparation by Michael Addition are disclosed in U.S. Pat. No. 4,485,236 (Rasmussen et al.), and in U.S. Pat. No. 5,149,806 (Moren et al.), the disclosures of which are incorporated by reference herein.

Optionally, azlactone-functional compositions are homopolymers, copolymers, and oligomers prepared from azlactone-functional compounds having at least two azlactone moieties covalently connected to a bridging group, defined below, as shown in Formula II:

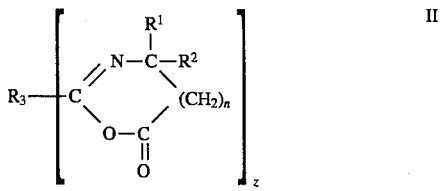

wherein $R^1$, $R^2$, and n are as previously defined, wherein z is at least two, wherein $R^3$ is a bridging group capable of covalently connecting a plurality of azlactone moieties. Optionally, the azlactone-functional composition can be the compound of Formula II without polymerization or other further reaction.

"Bridging group" means a group comprising (a) an alkylene group having up to 14 carbon atoms; (b) an arylene group having up to 10 carbon atoms; (c) a cycloalkylene group having up to 6 carbon atoms; (d) a group resulting from the Michael reaction of a Michael donor nucleophilic compound with a plurality of 2-alkenyl azlactone Michael acceptors, where the Michael donor nucleophilic compound has at least two nucleophilic moieties; or (e) a combination of the above-listed bridging groups. Nonlimiting examples of alkylene, arylene, and cycloalkylene groups are disclosed in "Polyazlactones" by J. K. Rasmussen, S. M. Heilmann, L. R. Krepski in *Encyclopedia of Polymer Science and Engineering*, Vol. 11, 2nd Ed., 1988, John Wiley & Sons, Inc., pp. 558–571, the disclosure of which is incorporated by reference. Nonlimiting examples of such Michael donor nucleophilic compounds include thiols and secondary amines as disclosed in U.S. Pat. No. 4,485,236 (Rasmussen et al.) incorporated by reference herein, or combinations thereof; or carbon acids, enamines, imides, and nitrogen heterocycles (as disclosed in U.S. Pat. No. 5,149,806 (Moren et al.) incorporated by reference herein) or combinations thereof.

Such azlactone-functional compositions can be prepared by the Michael Addition of 2-alkenyl azlactone monomers with nucleophilic group-substituted compounds having the formula $(HX)_n R^4$ where $R^4$ is an organic group that has a valence of n and is the residue of a nucleophilic group-substituted compound, $(HX)_n R^4$, in which X is —O—, —S—, —NH—, or —NR$^4$ wherein $R^4$ can be alkyl or aryl, and n is defined below, the residue having a molecular weight up to 20,000, preferably selected from mono-and polyvalent hydrocarbyl (i.e., aliphatic and aryl compounds having 2 to 20 carbon atoms and optionally zero to four catenary heteroatoms of oxygen, nitrogen or sulfur, e.g., piperazine, furan, and thiophene), polyoxyalkylene, polyester, polyolefin, polyacrylate, and polysiloxane residues that can optionally all be further substituted by at least one non-nucleophilic group such as cyano, halo, ester, ether, keto, nitro, silyl, sulfide (the carbon-containing groups having up to 10 carbon atoms), and nucleophilic groups including secondary amino groups, hydroxyl groups or mercapto groups; and n is an integer having a value of two to six.

Optionally azlactone-functional compounds shown in Formula II can be used to form other compositions, using one of the azlactone moieties as a reaction site. Such compositions are represented by Formula III:

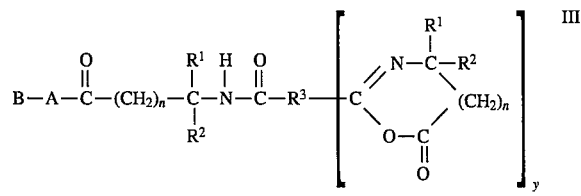

wherein $R^1$, $R^2$, and n are as previously defined, wherein y at least one and is the number of azlactone moieties less one, wherein $R^3$ is a bridging group capable of covalently connecting a plurality of azlactone moieties, and wherein B is the reactant and A is the residue of the azlactone-reactive nucleophilic group on the reactant, such as O, S, or $NR^5$, wherein $R^5$ is hydrogen or an alkyl group containing from 1 to 4 carbon atoms.

Azlactone-containing Monomers

Preferably, azlactone-functionality is provided to an azlactone-functional composition by 2-alkenyl azlactone monomers. The 2-alkenyl azlactone monomers are known compounds, their synthesis being described for example in U.S. Pat. Nos. 4,304,705; 5,081,197; and 5,091,489 (all Heilmann et al.) the disclosures of which are incorporated herein by reference.

Suitable 2-alkenyl azlactones include: 2-ethenyl-4,4-dimethyl-1,3-oxazolin-5-one, 2-isopropenyl-4,4-dimethyl-1,3-oxazolin-5-one, 2-ethenyl-4-methyl-4-ethyl-1,3-oxazolin-5-one, 2-isopropenyl-4-methyl-4-butyl-1,3-oxazolin-5-one, 2-ethenyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-ethenyl-4,4-diethyl-1,3-oxazolin-5-one, 2-ethenyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-ethenyl-4,4-pentamethylene-1,3-oxazolin-5-one, and 2-ethenyl-4,4-dimethyl-1,3-oxazolin-6-one.

The preferred 2-alkenyl azlactones include 2-ethenyl-4,4-dimethyl-1,3-oxazolin-5-one (referred to herein as VDM) and 2-isopropenyl-4,4-dimethyl-1,3-oxazolin-5-one (referred to herein as IDM).

Other azlactone-containing monomers include the 2-(4-alkenylphenyl)-5-oxazolones disclosed in U.S. Pat. No. 5,039,813, the disclosure of which is incorporated by reference.

If an azlactone-functional copolymer is to be formed, a co-monomer having similar or different chemical or physical properties can be included, depending on the desired characteristics for the copolymer to be blended. Nonlimiting examples of co-monomers useful to be copolymerized with azlactone-functional moieties to form copolymers include methyl methacrylate (MMA); vinyl acetate, or any of vinyl aromatic monomers; alpha, beta-unsaturated carboxylic acids or their derivatives or vinyl esters; vinyl alkyl ethers; olefins; N-vinyl compounds; vinyl ketones; styrene; or vinyl aldehydes.

Nonlimiting examples of such co-monomers are disclosed in European Patent Publication 0 392 735 and in European Patent Publication 0 392 783, the disclosures of which are incorporated by reference.

Azlactone-containing copolymers can be prepared in bulk polymerization according to U.S. Pat. No. 4,695,608 (Engler et al.) incorporated by reference herein.

Bulk Homopolymerization of Azlactone-Containing Monomers

While the present invention can use azlactone-functional homopolymers prepared by solution polymerization or suspension polymerization according to known techniques described in the European Publications and the "Polyazlactones" article identified above and Almog et al. *The British Polymer Journal,* 14(4), 131, (1982), the present invention provides a method of bulk polymerizing azlactone-containing monomers in a reaction vessel to form azlactone homopolymers in a solventless and continuous procedure.

In one embodiment, the one-step process, the solventless, bulk homopolymerization of azlactone-containing monomer occurs in situ in the same reaction vessel as blending and occurs concurrently with the blending of the azlactone homopolymer with the thermoplastic polymer, such that the blended polymers are extruded together. In this one-step embodiment, either a single-screw extruder or a twin-screw extruder can be used for the concurrent homopolymerization and blending.

In a second embodiment, the two-step process, bulk homopolymerization of the azlactone-containing monomer occurs in one step and then the resulting polymer is blended with a thermoplastic polymer. In this two-step embodiment, a twin-screw extruder is used for homopolymerization and subsequent blending.

Bulk homopolymerization is essentially solventless, continuous in production, and is essentially completely efficient in monomer conversion to homopolymer when using the two-step embodiment described above and at least 90% efficient in monomer conversion to homopolymer when using the one-step embodiment described above.

Bulk homopolymerization is different from reactive extrusion graft copolymerization described in European Patent Publication 0 392 783 for at least two reasons: (1) Reactive extrusion graft copolymerization is a modification of an existing polymer, whereas bulk homopolymerization is the formation of a homopolymer. (2) The azlactone homopolymer once formed is not covalently attached to the thermoplastic polymer.

Bulk homopolymerization employs a free radical initiation process. Acceptable free radical initiators include peroxide and azo compounds for the two-step embodiment described above and azo compounds for the one-step embodiment described above.

During the one-step process, azo compounds thermally decompose to give radicals that are poor hydrogen atom abstractors. Thus, hydrogen atom abstraction is minimized and bulk homopolymerization of azlactone-containing monomer is favored over grafting, crosslinking or chain scission.

Nonlimiting examples of azo compounds useful as homopolymerization initiators include azobis(substituted nitriles) (e.g., 1,1'-azobis(cyclohexane carbonitrile) or 2,2'-azobis(isobutyronitrile)) commercially available as VAZO branded compounds from DuPont.

Free radical initiators are present in the feedstream in weight percents ranging from about 0.05% to about 5% depending on whether the one-step process or two-step process is used.

Bulk homopolymerization also optionally employs adjuvants. These adjuvants gan assist in the formation of the homopolymer. Nonlimiting examples of adjuvants are triethylsilane, carbon tetrabromide, and isopropyl alcohol.

Adjuvants are optionally present in the feedstream in weight percents ranging from about 0.05% to about 5% depending on whether the one-step process or two-step process is used.

When the one-step process is used, the initial feedstream comprises alkenyl azlactone monomer, initiator, adjuvant, and thermoplastic polymer or preferably consists essentially of alkenyl azlactone monomer, initiator, and thermoplastic polymer. In this one-step process, alkenyl azlactone monomer comprises from about 0.5 weight percent to 10 weight percent of the initial feedstream.

When the two-step process is used, the initial feedstream comprises alkenyl azlactone monomer, initiator and adjuvant or preferably consists essentially of alkenyl azlactone monomer and initiator. In this step alkenyl azlactone monomer comprises at least 95 weight percent of the initial feedstream. The subsequent feedstream has thermoplastic polymer added for melt blending.

FIG. 1 is a schematic of an extruder 10, having a plurality of independently heated zones and a water cooled feed throat, useful for reactive extrusion processing as is those known to those skilled in the art and described in detail in European Patent Publication 0 392 783. Extruder 10 as shown is a twin-screw extruder but also can be a single screw extruder. Commercially available twin-screw extruders are a 34 mm Leistritz counter-rotating twin-screw extruder and a 40 mm Berstroff co-rotating twin-screw extruder. Extruder 10 is useful for the homopolymerization of azlactone monomer described in the first embodiment above.

Figure 2:
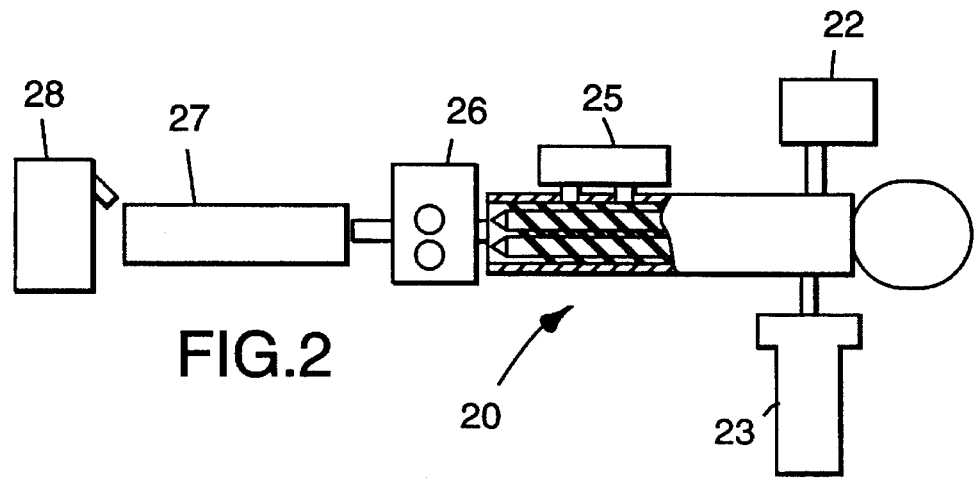
FIG. 2 is a schematic illustration of a twin screw extruder useful in the first step of a two-step process of the present invention.

FIG. 2 is a schematic of a twin-screw extruder 20 similar to extruder 10 useful for the homopolymerization of azlactone monomer according to the second embodiment described above.

Figure 3:
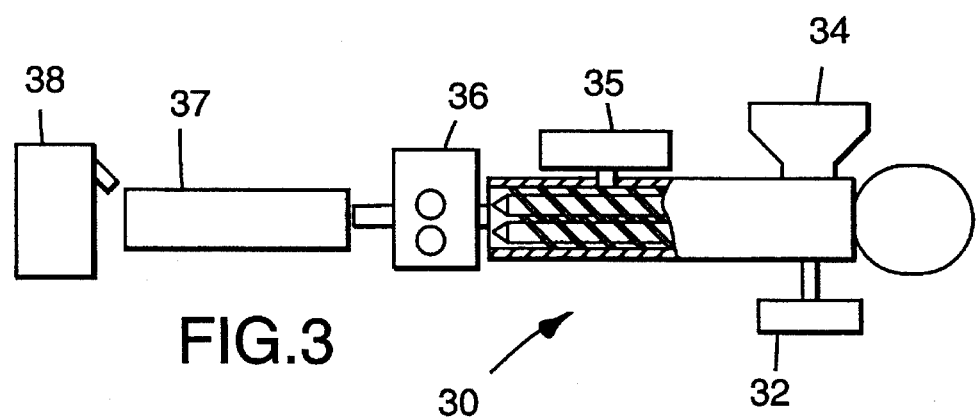
FIG. 3 is a schematic illustration of a twin screw extruder useful in the second step of a two-step process of the present invention.

FIG. 3 is a schematic of a twin-screw extruder 30 similar to extruder 10 useful for sequential melt blending of the product of extruder 20, except that azlactone homopolymer, rather than azlactone monomer, is introduced into the feed stream.

When using the one-step embodiment, azlactone-containing monomer and initiator is introduced to the feedstream at zone 1 from a vessel 12, which can be a pressurized vessel or a syringe pump.

Thermoplastic polymer in pelletized form or in a polymer solution is also introduced into the feedstream at or prior to zone 1 from vessel 14 through a feed throat.

At the sixth and seventh zones of extruder 10, there is a vacuum port 15 to vent off residual monomer and volatiles present. Gear pump 16 is used to eliminate surging and produce a continuous strand of material. The blended polymer is quenched in a bath 17 of cooling fluid, such as Fluorinert™ branded heat transfer liquid commercially available from Minnesota Mining and Manufacturing Company of St. Paul, Minn. in dry ice, or in a bed of dry ice. A water bath is not preferred because water would hydrolyze the azlactone functionality. The cooled, blended polymer is then directed through a pelletizer 18, such as a Conair pelletizer commercially available from Con Air Group of Bay City, Mich.

When using a single screw extruder or a counter-rotating twin-screw extruder in the one-step embodiment, the independently heated zones range in temperature from about 140° C. in the first zone to a high temperature of about 225° C. in the eighth zone and cooling to a temperature of 180° C. adjacent gear pump 16.

When using a counter-rotating twin-screw extruder for the bulk homopolymerization/blending embodiment, the independently heated zones range in temperature from about 150° C. in the first zone to about 180° C. in zones 3 through 10.

When using the two-step embodiment, extruder 20 is used with liquid azlactone-containing monomer being maintained in a nitrogen-purged, pressurized or preferably unpressurized vessel 22 and an azo initiator being dissolved in the monomer. Preferably, vessel 22 is stored in an ice bath. When pressurized, the nitrogen-purged environment is maintained at a pressure of about 14 kg/cm$^2$ [200 psi]. Then the monomer/initiator solution is introduced into the extruder from vessel 22 via a feed line to an open or preferably cooled feed throat. When an open feed throat is used, it is also kept under nitrogen purge conditions. The monomer solution feed rate is controlled by a valve and liquid flow meter or preferably a positive displacement pump, introducing monomer solution at a rate of about 10–150 g/min and preferably at a rate of about 38 g/min, depending on the type of equipment used and the ability of the equipment to vent the heat of the exothermic reaction of the bulk homopolymerization.

Adjuvant can be introduced using a positive displacement pump 23 such as that commercially available from Ruska of Instruments Corp. of Houston, Tex.

Vacuum ports (collectively 25) are present at the sixth and seventh zones for use in a similar manner as ports 15. The azlactone homopolymer proceeds through gear pump 25, corresponding to gear pump 15; bath 26, corresponding to bath 16; and pelletizer 28, corresponding to pelletizer 18.

When using a counter-rotating, twin-screw extruder for the two-step embodiment, the independently heated zones range in temperature from about 15° C. in the feed throat to about 50° C. in the first zone to about a maximum of 180° C. (preferably 100°–150° C.) in zones 3 through 10.

The amount of thermoplastic polymer introduced depends on the ultimate weight blend desired for the azlactone-functional article. The weight ratio of thermoplastic polymer to azlactone homopolymer can range from about 99.99:0.01 to about 90:10 and preferably from about 97:3 to about 94:6.

In the two-step embodiment where melt blending follows in sequence after the step of bulk homopolymerization of alkenyl azlactone monomer, FIG. 3 shows an extruder 30 for blending. In this second step, polyazlactone homopolymer or other azlactone-functional composition in a pelletized form is introduced to extruder 30 from vessel 32. Thermoplastic polymer is introduced in pelletized form into extruder 30 from vessel 34, preferably corresponding to vessel 14 used in the one-step process. Vacuum ports 35, preferably corresponding to ports 15 and 25, vent off volatiles. If thermoplastic polymer were introduced into the extruder 30 in solution, then vacuum ports 35 would vent off the solvent also. Gear pump 36, bath 37, and pelletizer 38 correspond to pump 26, bath 27, and pelletizer 28, respectively, in type and function.

Alternatively to using an extruder 30, melt blending can be conducted in a Brabender mixer.

Melt blending of thermoplastic polymer with azlactone homopolymer can occur at temperatures which are required for the melting of the thermoplastic polymer. Because azlactone homopolymer does not degrade significantly at temperatures below about 275° C. in the time frame of the extrusion process, there are no appreciable deleterious byproducts of the melt blending process. Preferably the melt blending should occur below about 210° C. to minimize discoloration of the resulting polymer blend.

The temperature of melt blending must be at least at or above the glass transition temperature (Tg) of the thermoplastic polymer and preferably is at least about 25° C. above the Tg of amorphous or glassy polymers such as polystyrene or polymethylmethacrylate and at least about 10° C. above the melting point of semicrystalline polymers such as polyethylene and polypropylene.

Melt Blending Azlactone-functional Composition with Thermoplastic Polymer

A third embodiment of the invention is the melt blending of azlactone-functional compositions, other than azlactone homopolymer prepared by bulk homopolymerization in either embodiment described above, with thermoplastic polymer using a twin-screw extruder, such as extruder 30 as seen in FIG. 3, or other mixing process.

Melt blending of thermoplastic polymer with azlactone-functional compositions, prepared separately from the melt blending vessel, can occur at temperatures which are required for the melting of the thermoplastic polymer. Because azlactone-functional compositions do not degrade significantly at temperatures below about 275° C., there are no deleterious byproducts of the melt blending process. However, care should be taken with azlactone-functional compositions prepared by Michael Addition reaction to use only with lower melting thermoplastic polymers because of lower degradation temperatures of these types of compositions. Preferably to minimize discolorization, the melt blending should occur below about 210° C.

The temperature of melt blending must be at least at or above the glass transition temperature (Tg) of the thermoplastic polymer and preferably is at least about 25° C. above the Tg of amorphous or glassy polymers such as polystyrene or polymethylmethacrylate and at least about 10° C. above the melting point of semicrystalline polymers such as polyethylene and polypropylene. For example, the melt blending temperature for Nylon 6 commercially available from BASF is about 220° C. which exceeds a temperature that is practical for a reactive extrusion process to form a graft copolymer from VDM and Nylon 6 according to the disclosure of European Publication 0 392 783.

The weight ratio of thermoplastic polymer to azlactone-functional composition can range from about 99.99:0.01 to about 50:50, and preferably about 95:5, when the azlactone-functional composition is azlactone homopolymer prepared according to the method described in "Polyazlactones" article or Example 5B of European Patent Publication 0 392 735, incorporated by reference herein.

In addition to azlactone homopolymer prepared by bulk homopolymerization described above and azlactone homopolymer prepared by suspension or solution polymerization, any of the azlactone copolymers and oligomers described above in the section entitled Azlactone-functional Compositions can be used in melt blending with thermoplastic polymer. These blends need not be compatible. However, the reactivity of incompatible blends with biologically active substances is not comprimised by polymer blend incompatibility. Selections of thermoplastic polymer and the azlactone-functional composition are not limited, unless the azlactone-functional composition contains monomeric units of the thermoplastic polymer. In that instance, the azlactone-functional composition is melt blended with a different thermoplastic polymer having different monomeric units than found in the azlactone-functional composition. Generally, the mixing conditions and temperature conditions for melt blending are the same. A preferred comonomer for the azlactone-functional copolymer is styrene, preferably prepared by graft reactive extrusion according to the methods of European Patent Publication 0 392 783. Preferably, the graft copolymer reactively extruded is styrene with VDM grafted thereto, in a weight ratio ranging from about 99.99:0.01 to about 90:10 and preferably about 95:5 styrene:VDM. In that instance, a styrene:VDM graft copolymer can be blended with thermoplastic polymers that do not contain styrene. This unexpectedly results in blended polymers that have the advantages of all three monomeric components: the azlactone functionality, the styrene base polymer for the azlactone grafts, and the non-styrene polymer for blending.

While azlactone-functional graft copolymers prepared by reactive extrusion are acceptable for melt blending, these copolymers are not as preferred as azlactone homopolymers because the reactive extrusion process using peroxide, free radical initiators can cause crosslinking and/or chain scission of the base polymer. Further, there can be unwanted, unreacted VDM remaining in the reactively extruded product, if the process is not properly controlled. Use of azlactone homopolymer and especially bulk homopolymerized azlactone avoids these possible difficulties.

Melt Flow Index

To make an azlactone-functional article suitable for further processing, the melt blending of the azlactone-functional composition with the thermoplastic polymer should not adversely alter bulk properties of the thermoplastic polymer. Melt flow index is a key bulk property. The azlactone-functional composition can have a melt flow index (g/10 min.) ranging from within about 50% of the melt flow index of the thermoplastic polymer alone to within about 99% of the melt flow index of the thermoplastic polymer alone. Preferably, the melt flow index of the azlactone-functional article is within about 75% of the melt flow index of the thermoplastic polymer alone.

Usefulness of the Invention

Azlactone-functional articles can have countless uses. As described in the European Publications identified above, azlactone-functional surfaces are particularly useful for nucleophilic reaction with nucleophilic, biologically active substances, defined in the Summary Section.

Because a melt blending of thermoplastic polymer with azlactone-functional composition yields a product that is both azlactone-functional and melt processable, any shape of azlactone-functional article capable of being formed thermally can be made. Nonlimiting examples of molding techniques that can be employed include injection molding, blow molding, extruding, melt blowing, compression molding, thermoforming, and the like.

Articles of the present invention are especially suited for molded medical articles, molded diagnostic articles, and other biochemical or biopharmaceutical molded equipment likely to be associated or in contact with biologically active substances.

Because azlactone-functional moieties occupying a surface of a molded article are capable of multiple chemical reactions, azlactone-functional surfaces of the present invention can form adduct molded articles. Because azlactones do not require intermediate chemical activation for the formation of adducts, azlactones have exceptional versatility and efficiency.

Electrophilic azlactone-functional moieties can react through a ring opening reaction at the carbonyl group with any of a myriad of nucleophilic reagents. The result is the formation of an adduct molded article having specific reactivities determined by the nature of the nucleophilic reagent employed in the reaction.

Nonlimiting examples of nucleophilic reagents include biologically active substances, acids, bases, chelators, hydrophiles, lipophiles, hydrophobes, zwitterions, detergents, and any other chemical which can react with the azlactone-functionality to confer on the surfaces of the molded article a modified reactivity which differs from that which existed on the article prior to azlactone-functionality modification. For example, one can modify a hydrophobic surface by reacting an azlactone-functional molded article with a nucleophilic, hydrophilic moiety. Examples of nucleophilic, hydrophilic compounds include poly(oxyalkylene amines) commercially available as Jeffamines from Texaco, Inc.

Thus, surfaces of an azlactone-functional article can be molded in any desired shape while remaining reactive toward nucleophilic reagents. Unexpectedly, a thermoplastic article can add all of the benefits of azlactone-functionality without an effective diminution of the physical and chemical characteristics of bulk properties of the thermoplastic polymer or its characteristics after molding.

Ligands and Adduct Molded Articles

Adduct molded articles have ligands coupled or otherwise tightly bound to azlactone-functional moieties extending from surfaces of molded articles to form biologically or chemically active reaction sites. For direct coupling, nonlimiting examples of nucleophilic ligands include primary and secondary amines, alcohols, and mercaptans. Of these, amine-functional ligands are especially preferred.

While not being limited to a particular theory, it is believed that a ligand forms a covalent bond when coupled to an azlactone-functional moiety.

Ligands useful for the preparation of adduct molded articles can also vary widely within the scope of the present invention. Preferably, a ligand is chosen based upon the contemplated end use of the adduct molded article.

Once ligands are coupled to azlactone-functional surfaces of a molded article, such ligands are available for biological or chemical interaction, such as adsorbing, complexing, catalysis, or reagent end use.

Adduct molded articles are useful as adsorbants, complexing agents, catalysts, reagents, as enzyme- and other protein-bearing molded articles, and as chromatographic articles.

Azlactone-functional moieties will undergo nucleophilic attack by amines, thiols, and alcohols. Thus, ligands having at least one amine, thiol, or alcohol group thereon are candidates for coupling to azlactone-functional surfaces.

In a preferred aspect of the present invention, the ligand desired for coupling is a biologically active substance having azlactone-reactive, nucleophilic functional groups. Nonlimiting examples of biologically active materials are substances which are biologically, immuno-chemically, physiologically, or pharmaceutically active. Examples of biologically active substances include proteins, peptides, polypeptides, antibodies, antigenic substances, enzymes, cofactors, inhibitors, lectins, hormones, receptors, coagulation factors, amino acids, histones, vitamins, drugs, cell surface markers, and substances which interact with them.

Of the biologically active substances, proteins, enzymes and antigenic substances are desired for coupling to azlactone-functional molded articles. Nonlimiting examples of proteins, enzymes, and antigenic substances include natural and recombinant Protein A (ProtA), Immunoglobulins such as rat (rIgG), human (hIgG), bovine (bIgG), rabbit (rbIgG), and mouse (mIgG), Concanavalin A (ConA), Bovine Serum Albumin (BSA), Thyroglobulin (TG), Apoferritin (Af), Lysozyme (Ly), Carbonic Anhydrase (CA), Lipase, Pig Liver Esterase, Penicillin acylase, and Bacterial Antigen (BA). Uses for immobilized proteins, enzymes and antigenic substances are disclosed in European Patent Publication 0 392 735.

Alternatively, a molded article of the present invention can comprise a coupled enzyme to catalyze a chemical transformation of substances recognized by the enzyme. Also, a molded article comprising a coupled antigenic substance can be utilized for affinity purification of a corresponding antibody from a complex biological fluid. In other examples, an adduct molded article having Protein A coupled to internal and external surfaces can adsorb biologically active materials such as Immunoglobulin G for affinity separation processes. In other examples, an adduct molded article can be used for immobilization of antibodies or be used for immunodiagnostics or for Western blotting.

Alternatively, the ligand can be a hydrophile for improving compatibility of mammalian body implants, such as intraocular lenses, with adjoining tissues. One example of a ligand especially suitable for chemically modifying body implants is an anticoagulant, such as a chemically-modified heparin, e.g., an amine-terminated heparin. Nonlimiting examples of body implants, with which the molded articles of the present invention could be useful, include artificial organs, heart valves, left ventricular assist devices, and the like.

Alternatively, the molded article can be an anticoagulant-treated tubing, connectors, fittings, biosensors, and the like used in association with blood and blood products. Nonlimiting examples include blood oxygenators, dialysis machines and the like.

Diagnostic uses of molded articles of the present invention could rely on the capability of specific surface interaction provided by azlactone-functional surfaces. Nonlimiting examples include microtitration wells and plates, chemosensors, and nylon membranes which are widely used in biochemical binding studies, such as in clinical, chemical, or medical diagnostics operations.

Optical clarity is particularly desired in clinical, chemical, and medical diagnostic applications. Depending on the type of thermoplastic polymer selected for blending, azlactone-functional articles can be effectively translucent and preferably optically clear and colorless. Unexpectedly, melt blends of poly(methyl methacrylate) and azlactone homopolymer form optically clear, colorless moldable blends. Even though the blends are optically clear, the two polymers are not miscible. Scanning electron microscopy shows dispersed spheres of polyVDM of 0.1–0.3 μm diameter in a matrix of poly(methyl methacrylate). Nonetheless, the surfaces of the blend appear identical to the poly(methyl methacrylate) alone.

For example, a blend of poly(methyl methacrylate) and poly(vinyldimethylazlactone) homopolymer in a weight ratio of 95:5 yields an optically clear and colorless article formed by thermal processing.

There are also numerous potential uses outside of medical applications. Often multilayered devices need to be fabricated with tie layers, intermediate coatings to bond two functional layers together. Use of azlactone-functional articles of the present invention would allow one skilled in the art to design the two functional layers so that the layers retained their inherent function while also directly bonding with one another, eliminating the need for the tie layer and simplifying the manufacturing process.

Another potential application is a bio-active blown microfiber web, preferably using a polyolefin blended with a azlactone-functional composition, and then extruded through web-forming equipment to form a nonwoven, azlactone-functional web.

Coupling of ligands to preferred azlactone-functional surfaces can use methods of using inorganic or organic polyanionic salts in such concentrations as to achieve high bound specific biological activity for the coupled ligand, such as methods disclosed in U.S. Pat. No. 5,200,471 (Coleman et al.), the disclosure of which is incorporated by reference.

Coupling of ligands to azlactone moieties of Formula I above results in adduct molded articles having activated surfaces having the formula

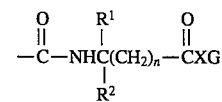

wherein $R^1$, $R^2$, and n are as previously defined,

X can be —O—, —S—, —NH—, or —$NR^5$ wherein $R^5$ can be alkyl or aryl, and

G is the residue of HXG which performs the adsorbing, complexing, catalyzing, separating, or reagent function of the adduct molded article.

HXG is a nucleophilic reagent and can be a biologically active substance, dye, catalyst, reagent, and the like.

Ligands having azlactone-reactive, amine, hydroxy, or thiol nucleophilic functional groups react, either in the presence or absence of suitable catalysts, with azlactone-functional groups by nucleophilic addition as depicted in the equation.

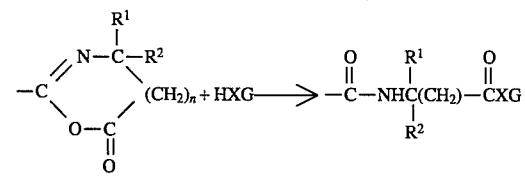

wherein $R^1$, $R^2$, X, and G are as previously defined.

Depending on the functional group present in the ligand, catalysts may be required to achieve effective attaching reaction rates. Primary amine functional groups require no catalysts. Acid catalysts such as trifluoroacetic acid, ethanesulfonic acid, toluenesulfonic acid, and the like are effective with hydroxy and secondary amine functional groups.

In other aspects of the invention, the ligand is not biologically active but has other properties which lead to its end use. For example, the ligand can contain ionic functional groups. In that event, the resultant adduct article may be utilized in ion exchange type applications. Suitable ionic groups include carboxylic acid, sulfonic acid, phosphonic acid, tertiary amine, and quaternary amine groups. Examples of useful ionic group containing ligands include aminocarboxylic, sulfonic, or phosphonic acids such as glycine, alanine, leucine, valine, β-alanine, γ-aminobutyric acid, 1- and 3-aminopropyl phosphonic acid, taurine, γ-amino octanoic acid, aminomethylphosphonic acid, amino methanesulfonic acid, and the like; hydroxy-acids such as isethionic acid, 3-hydroxy propane sulfonic acid, lactic acid, glycolic acid, hydroxymethylphosphonic acid, p-hydroxybenzoic acid, and the like; and amino- and hydroxy-functional tertiary and quarternary amines such as 2-diethylaminoethylamine, 3-dimethyl aminopropylamine, N,N-diethylethanol amine, and the like, and quaternized versions thereof. When the amine-, hydroxy- or thiol-functional ligand is a simple aliphatic and/or aromatic hydrocarbon, the resultant adduct article may be useful in reverse phase or hydrophobic interaction type chromatographic processes.

Reaction of a molded article of this invention with very hydrophilic or hydrophobic ligands can be used to produce adduct articles displaying highly absorbant properties towards aqueous or oily fluids, respectively. Other types of ligands and uses will be obvious to one skilled in the art and are considered to be within the scope of the present invention.

Embodiments of the invention are further described in the following examples.

Examples 1–7: Melt Blending of PVDM With Various Thermoplastic Polymers

The mixing chamber of a Brabender Plasticorder mixer (Model EPL-V5501, equipped with a RE.E.6 mixing head, a type SP-T1002 temperature control console and a torque rheometer) was preheated to 180° C. under a nitrogen purge. Polyethylene (PE in Table 1) (38 g; Dow LLDPE 2517) was added to the mixing chamber under a nitrogen purge and mixed at 50 rpm until melted. Poly(2-vinyl-4,4-dimethylazlactone), PVDM, (2 g; prepared according to Example 5B of European Patent Publication 0 392 735) was added to the mixing polyethylene. The two polymers were mixed at 50 rpm for 4 min. The resulting blend was removed from the mixer and stored in a desiccator at room temperature.

The blend compositions shown in Table 1 below were prepared using the same equipment and methods as used to prepare the polyethylene blend. PS is polystyrene. PUR is polyurethane. PMMA is poly(methyl methacrylate).

TABLE 1

Blend Compositions

| Example | Base Polymer | Wt % PVDM | Blend Temp |
|---|---|---|---|
| 2 | PP (FINA 8771) | 5 | 180° C. |
| 3 | PS (Polysar 101-300) | 2 | 180° C. |
| 4 | PS (Polysar 101-300) | 5 | 180° C. |
| 5 | PUR (Dow 2363) | 5 | 210° C. |
| 6 | Nylon 6 (BASF B4) | 5 | 220° C. |
| 7 | PMMA (Rohm & Haas VO44) | 5 | 200° C. |

All blends with the exception of the PMMA blend appear cloudy in the melt state and at room temperature. The PMMA/PVDM blend appears optically clear to the naked eye. The presence of intact azlactone rings in the blends was confirmed by the presence of a strong absorption band at 1827 cm$^{-1}$ in the infrared spectra.

The melt flow index of the polymer blends was determined using a Tinius-Olsen Extrusion Plastometer equipped with a MP987 controller and WL 987 lifter. The results are shown in Table 2 below.

TABLE 2

Melt Flow Index (g/10 min) Measurements

| Sample | Conditions | Melt Flow Index |
|---|---|---|
| Example 1 | 190° C./2160 g | 15.9 |
| PE control | 190° C./2160 g | 20.8 |
| Example 2 | 190° C./7.4 Kg | 39.2 |
| PP control | 190° C./7.4 Kg | 35.8 |
| Example 3 | 210° C./7.4 Kg | 12.6 |
| Example 4 | 210° C./7.4 Kg | 15.3 |
| PS control | 210° C./7.4 Kg | 9.4 |
| Example 6 | 225° C./7.4 Kg | 2.6 |
| Nylon control | 225° C./7.4 Kg | 16.4 |
| Example 7 | 220° C./8.5 Kg | 3.6 |
| PMMA control | 220° C./8.5 Kg | 3.3 |

As can be seen from the values shown in Table 2, blending in PVDM does not significantly change the melt flow index of the base polymer except in the case of the nylon blend. It is believed that the significant decrease in the melt flow index of the nylon/PVDM blend as compared to nylon is due to the reaction of the terminal amine groups of the nylon with the azlactone ring resulting in chain extension and branching of the nylon.

Films for protein binding studies were prepared by pressing several grams of the polymer blend between TEFLON™ coated aluminum sheets at a pressure of 5,000 psi (350 Kg/cm$^2$) and a temperature of 180° C. (210° C. for PUR and nylon blends; 200° C. for the PMMA blend) for 10 sec in a Wabash heated press. Pressed samples were cooled from the molten state by blotting the metal sheets with a wet paper towel with care being taken to avoid wetting the films. The films were stored in a desiccator.

The ability of films prepared from the blends of Examples 1–7 to bind protein was determined using the following procedure. Protein A (Repligen, Cambridge, Mass.) was radioiodonated with NaI$^{125}$ using Iodo-Beads (Pierce Chemical Co., Rockford, Ill.) and diluted to give a specific radioactivity of 4900–5800 cpm/μg of protein dissolved in buffer with a final protein concentration of 250 μg/mL. Two different buffers were employed. The chloride buffer contained 25 mM sodium phosphate and 150 mM sodium chloride with a pH of 7.5. The sulfate buffer contained 25 mM sodium phosphate and 1.5M sodium sulfate with a pH of 7.5.

Discs (8 mm diameter) were punched from each film using a standard office paper punch. Each disc was placed in a 2.0 mL polypropylene microfuge tube then incubated with 200 μL of Protein A solution for 2 hours at ambient temperature with rocking. Each blend and control were run in triplicate. After 2 hours the protein solution was removed and unreacted azlactone was inactivated by incubating the disc with 1.0M ethanolamine (500 μL solution in 25 mM sodium pyrophosphate, pH 9.0) for 1 hour with rocking. All discs were rinsed for a minimum of 15 minutes with 500 μL of the chloride buffer. Bound radioactivity was determined with a Packard Gamma Scintillation Spectrometer (Model 5230; Packard Instruments, Downers Grove, Ill.). Following the initial radioactivity determination, the discs were incubated with 500 μL of a 1% aqueous solution of sodium dodecyl sulfate (SDS) for 4 hours at 37° C. The discs were rinsed 3 times with the warm SDS solution and the residual radioactivity was determined. SDS is a protein denaturing detergent and serves to remove adsorbed (as opposed to covalently coupled) protein from the film. The results of the protein binding studies are shown in Table 3 below.

TABLE 3

Protein A Binding Results (chloride/sulfate)

| Sample | Bound Protein (μg/cm$^2$) | % SDS Resistance | Coupled Protein (μg/cm$^2$) |
|---|---|---|---|
| Example 1 | 0.20/0.31 | 72/71 | 0.14/0.22 |
| PE Control | 0.25/0.26 | 8/8 | 0.02/0.02 |
| Example 2 | 0.34/0.38 | 67/68 | 0.23/0.26 |
| PP Control | 0.36/0.30 | 10/8 | 0.04/0.02 |
| Example 3 | 0.34/0.51 | 58/67 | 0.20/0.35 |
| Example 4 | 0.40/0.54 | 56/62 | 0.22/0.34 |
| PS Control | 0.43/0.32 | 23/22 | 0.10/0.07 |
| Example 5 | 0.25/0.41 | 68/65 | 0.17/0.26 |
| PUR Control | 0.23/0.23 | 17/14 | 0.04/0.03 |
| Example 6 | 0.28/0.58 | 47/60 | 0.13/0.34 |
| Nylon | 0.25/0.36 | 26/21 | 0.06/0.07 |

TABLE 3-continued

Protein A Binding Results (chloride/sulfate)

| Sample | Bound Protein (μg/cm²) | % SDS Resistance | Coupled Protein (μg/cm²) |
|---|---|---|---|
| Control Example 7 | 0.23/0.34 | 52/72 | 0.12/0.25 |
| PMMA Control | 0.19/0.19 | 18/14 | 0.03/0.03 |

Example 8: Retention of PVDM in the Melt Blend

A film sample of the PVDM/PE blend prepared in Example 1 was extracted for 48 hours in tetrahydrofuran using a Soxhlet extraction apparatus. Infrared spectrograms were taken before and after extraction. Integration of the azlactone ring band at 1824 cm$^{-1}$ was used to quantify the percent of the PVDM extracted from the film. The infrared analysis showed that 91% of the PVDM was retained in the blend after extraction. The percent of PVDM retained in the blend was increased further by partially cross-linking the PVDM. This was accomplished by adding 5 wt % of Jeffamine D-400 (a 400 molecular weight diamine terminated polypropylene oxide available from Texaco) to the blend during processing in the Brabender mixer. Extraction with tetrahydrofuran of a film of the resulting blend showed 100 percent retention of the PVDM in the blend.

Examples 9–12: Bulk Homopolymerization of VDM and Melt Blending with LLDPE Using a Single Screw Extruder The polymerization/blending process was carried out in a Killion 1.25 inch (3.2 cm), 42:1 Length/Diameter single screw extruder. VAZO™ 88 (1,1'-azobis(cyclohexanecarbonitrile), 5.2 g; from DuPont) was dissolved in 100 g of monomeric 2-ethenyl- 4,4-dimethyl-2-oxazoline-5-one, VDM (available from SNPE) and purged with nitrogen. LLDPE (Dow 2517) was starve fed into the feed throat of the extruder under a nitrogen atmosphere. The monomer/initiator was fed into the extruder feed throat via a Sage model 355 syringe pump. Table 4 shows the extruder conditions used to prepare the blends of examples 9–12. For all four examples the LLDPE feed rate was 40 g/min, the VDM feed rate was 114 cc/hr, the VDM concentration in the blend was 5% by weight and the initiator concentration was 0.25% by weight.

TABLE 4

Single Screw Extruder Conditions

| | Example 9 | Example 10 | Example 11 | Example 12 |
|---|---|---|---|---|
| Zone 1 | 130° C. | 130° C. | 130° C. | 130° C. |
| Zone 2 | 130° C. | 130° C. | 130° C. | 130° C. |
| Zone 3 | 130° C. | 130° C. | 130° C. | 130° C. |
| Zone 4 | 145° C. | 145° C. | 145° C. | 145° C. |
| Zone 5 | 170° C. | 170° C. | 200° C. | 200° C. |
| Zone 6 | 180° C. | 200° C. | 200° C. | 200° C. |
| Zone 7 | 180° C. | 210° C. | 210° C. | 210° C. |
| Zone 8 | 180° C. | 210° C. | 210° C. | 210° C. |
| RPM | 30 | 30 | 20 | 50 |

The melt flow index of the polymer blends was determined using a Tinius-Olsen Extrusion Pastometer equipped with a MP987 controller and WL 987 lifter. All measurements were made at 180° C., 2.5 Kg. The values obtained are shown in Table 5 below.

TABLE 5

Melt Flow Index Measurements

| Sample | Melt Flow Index (g/10 min) |
|---|---|
| PE Control | 24.5 |
| Example 9 | 23.9 |
| Example 10 | 21.5 |
| Example 11 | 22.1 |
| Example 12 | 21.4 |

As can be seen from the values in Table 5, little cross-linking of the PE takes place during in-situ blending as evidenced by the small decrease in the melt flow index of the blends of Examples 9–12.

Films for protein binding studies were prepared by pressing several grams of the polymer blend between chrome plates at a pressure of 20,000 psi (1400 Kg/cm²) and a temperature of 180°–200° C. in a Wabash heated press.

The ability of films prepared from the blends of Examples 9–12 to bind protein was determined using human IgG (Sigma Chemical Co., St. Louis, Mo.). The procedure used was similar to that described above for Protein A with the following changes: the sulfate buffer consisted of 0.75M sodium sulfate, 25 mM sodium phosphate, pH 7.5 since higher sulfate concentrations caused IgG precipitation; and 250 μL of protein incubation solution was used. The results are shown in Table 6 below.

TABLE 6

Human IgG Binding Results (chloride/sulfate)

| Sample | Bound Protein (μg/cm²) | % SDS Resistance | Coupled Protein (μg/cm²) |
|---|---|---|---|
| PE Control | 1.57/2.18 | 34/28 | 0.55/0.61 |
| Example 9 | 0.80/1.22 | 78/68 | 0.62/0.82 |
| Example 10 | 0.84/1.57 | 72/70 | 0.61/1.10 |
| Example 11 | 1.09/1.65 | 65/64 | 0.71/1.04 |
| Example 12 | 1.03/1.93 | 66/63 | 0.66/1.19 |

Examples 13 & 14: Bulk Homopolymerization of VDM and Melt Blending with LLDPE in a One-Step Process Using a Twin Screw Extruder The polymerization/blending process was carried out in a Leistritz 34 mm, 35:1 L/D counter rotating twin-screw extruder (Leistritz™ model LSM 30.34GG, Nuremburg, Germany). Vazo 88(5.2 g) was dissolved in 100 g of monomeric VDM and purged with nitrogen. LLDPE (Dow 2517) was starve fed into the feed throat of the extruder under a nitrogen atmosphere. The monomer/initiator was fed into the extruder throat via a Sage model 355 syringe pump. Table 7 below shows the extruder conditions. Both blends were prepared with 5% by weight of VDM and 0.25% by weight of VAZO 88.

TABLE 7

Twin Screw Extruder Conditions

| | Example 13 | Example 14 |
|---|---|---|
| Temp (°C.) Zone 1 | 145 | 140 |
| Temp (°C.) Zone 2 | 160 | 150 |
| Temp (°C.) Zone 3 | 160 | 150 |
| Temp (°C.) Zone 4 | 167 | 170 |
| Temp (°C.) Zone 5 | 200 | 170 |
| Temp (°C.) Zone 6 | 195 | 200 |
| Temp (°C.) Zone 7 | 190 | 200 |

TABLE 7-continued

| Twin Screw Extruder Conditions | | |
|---|---|---|
| | Example 13 | Example 14 |
| Temp (°C.) Zone 8 | 225 | 200 |
| Temp (°C.) Zone 9 | 205 | 200 |
| Temp (°C.) Zone 10 | 215 | 200 |
| Temp (°C.) Block | 180 | 200 |
| RPM | 102 | 50 |
| LLDPE feed rate (g/min) | 40 | 13 |
| VDM feed rate (cc/hr) | 114 | 44 |

The melt flow index (MI) of each blend was determined using the method and conditions described for Examples 9–12. The blend of Example 13 had a MI of 21.3 and that of Example 14 had a MI of 14.8.

Films for protein binding studies were prepared by pressing several grams of the polymer blend between chrome plates at a pressure of 20,000 psi (1400 Kg/cm$^2$) and a temperature of 180°–200° C. in a Wabash heated press.

The ability of films prepared from the blends of Examples 13 and 14 to bind human IgG was determined using the procedure described above. The results are shown in Table 8 below.

TABLE 8

| Human IgG Binding Results (chloride/sulfate) | | | |
|---|---|---|---|
| Sample | Bound Protein (µg/cm$^2$) | % SDS Resistance | Coupled Protein (µg/cm$^2$) |
| PE Control | 1.57/2.18 | 34/28 | 0.55/0.61 |
| Example 13 | 1.19/2.09 | 67/63 | 0.79/1.31 |
| Enample 14 | 1.26/2.11 | 65/64 | 0.82/1.30 |

EXAMPLE 15

The mixing chamber of a Brabender Plasticorder mixer (Model EPL-V5501) equipped with a RE.E.6 mixing head, a type SP-T1002 temperature control console and a torque, rheometer was preheated to 180° C. PMMA (38 g; Rohm & Haas VM100) was added to the chamber and melted. Vazo 88 (0.10 g) was dissolved in 2.0 g of monomeric VDM. The VDM/initiator mixture was added to the PMMA melt with mixing at 55 rpm under a nitrogen purge. The polymer was mixed for 4 minutes. The resulting blend was removed from the mixer and stored in a desiccator at room temperature.

Films for protein binding studies were prepared by pressing several grams of the polymer blend between chrome plates at a pressure of 20,000 psi (1400 Kg/cm$^2$) and a temperature of 180°–200° C. in a Wabash press.

The ability of films prepared from the blend of Example 15 to bind human IgG was determined using the procedure described above. The results are shown in Table 9 below.

TABLE 9

| Human IgG Binding Results (chloride/sulfate) | | | |
|---|---|---|---|
| Sample | Bound Protein (µg/cm$^2$) | % SDS Resistance | Coupled Protein (µg/cm$^2$) |
| PMMA Control | 1.71/1.30 | 25/33 | 0.42/0.43 |
| Example 15 | 1.97/1.95 | 45/49 | 0.88/0.94 |

Examples 16–20: Higher Molecular Weight PVDM Melt Blended with PUR Using a Brabender Mixer Monomeric VDM (30 g) was combined with 90 g of tetrahydrofuran and 0.06 g 2,2'-azobis(isobutyronitrile) (AIBN) in a 250 mL round bottom flask and heated under a nitrogen purge at 55°–60° C. for 24 hours. The resulting polymer solution was poured into approximately 370 g of hexane. The precipitated polymer was collected by filtration and dried under vacuum at 60° C. overnight. The resulting PVDM homopolymer was found by gel permeation chromatography to have a number-average relative molecular mass ($M_N$) of 34,600. This homopolymer was blended with polyurethane (Pellethane 2363 65D; Dow) in a Brabender mixer, equipped as described above, at 210° C. for 3 minutes. The blend compositions and melt flow index values (2.5 Kg; 210° C.) are shown in Table 10 below.

TABLE 10

| PUR/PVDM ($M_N$ = 34,600) Blends | | |
|---|---|---|
| Sample | % PVDM | Melt Flow Index (g/10 min) |
| PUR Control | 0 | 6.7 |
| Example 16 | 1 | 10.8 |
| Example 17 | 2 | 10.7 |
| Example 18 | 3 | 6.8 |
| Example 19 | 5 | 8.9 |
| Example 20 | 10 | 3.9 |

Films for protein binding studies were prepared by pressing several grams of the polymer blend between chrome plates for 5 seconds at a pressure of 20,000 psi (1400 Kg/cm$^2$) and a temperature of 225° C. The plates were chilled in dry ice to facilitate the removal of the films.

The ability of films prepared from the blends of Examples 16–20 to bind human IgG was determined using the procedure described above. The results are shown in Table 11 below.

TABLE 11

| Human IgG Binding Results (chloride/sulfate) | | | |
|---|---|---|---|
| Sample | Bound Protein (µg/cm$^2$) | % SDS Resistance | Coupled Protein (µg/cm$^2$) |
| PUR Control | 1.24/1.13 | 20/15 | 0.24/0.16 |
| Example 16 | 1.41/1.20 | 32/34 | 0.45/0.41 |
| Example 17 | 1.35/1.15 | 33/31 | 0.44/0.36 |
| Example 18 | 1.40/1.17 | 46/46 | 0.65/0.55 |
| Example 19 | 1.44/1.20 | 52/47 | 0.76/0.57 |
| Example 20 | 1.22/1.05 | 64/63 | 0.78/0.66 |

Examples 21–25: Lower Molecular Weight PVDM Melt Blended with PUR Using a Brabender Mixer Monomeric VDM (30 g) was combined with 90 g of tetrahydrofuran and 0.30 g of AIBN and heated under a nitrogen purge at 65° C. for 24 hours. The resulting polymer solution was poured into approximately 360 g of hexane. The precipitated polymer was collected by filtration and dried under vacuum at 60° C. overnight. The resulting PVDM homopolymer was found by gel permeation chromatography to have a number-average relative molecular mass ($M_N$) of 15,700. This homopolymer was blended with polyurethane (PELLETHANE™ 2363 65D; Dow) in a Brabender mixer, equipped as described above, at 210° C. for 3 minutes. The blend compositions and the melt flow index values (2.5 Kg; 210° C.) are shown in Table 12 below.

TABLE 12

PUR/PVDM ($M_N$ = 15,700) Blends

| Sample | % PVDM | Melt Flow Index (g/10 min) |
|---|---|---|
| PUR Control | 0 | 6.7 |
| Example 21 | 1 | 9.5 |
| Example 22 | 2 | 9.7 |
| Example 23 | 3 | 9.4 |
| Example 24 | 5 | 10.0 |
| Example 25 | 10 | 6.4 |

Films for protein binding studies were prepared as described above for Examples 16–20.

The ability of films prepared from the blends of Examples 21–25 to bind human IgG was determined using the procedure described above. The results are shown in Table 13 below.

TABLE 13

Human IgG Binding Results (chloride/sulfate)

| Sample | Bound Protein ($\mu g/cm^2$) | % SDS Resistance | Coupled Protein ($\mu g/cm^2$) |
|---|---|---|---|
| PUR Control | 1.24/1.13 | 20/15 | 0.24/0.16 |
| Example 21 | 1.37/1.06 | 62/56 | 0.85/0.59 |
| Example 22 | 1.33/1.06 | 66/64 | 0.88/0.67 |
| Example 23 | 1.40/1.12 | 64/69 | 0.89/0.78 |
| Example 24 | 1.30/1.00 | 72/67 | 0.93/0.68 |
| Example 25 | 1.36/1.01 | 74/73 | 1.01/0.74 |

Examples 26–30: Lower Molecular Weight PVDM Blended with PMMA Using a Brabender Mixer PMMA (Rohm & Haas VM100) was blended with a PVDM homopolymer having a $M_N$=15,700 in a Brabender mixer at 200° C. The blend compositions and melt flow index values (200° C.; 7.4 Kg) are shown in Table 14 below.

TABLE 14

PMMA/PVDM ($M_N$ = 15,700) Blends

| Sample | % PVDM | Melt Flow Index (g/10 min) |
|---|---|---|
| PMMA Control | 0 | 5.4 |
| Example 26 | 1 | 5.4 |
| Example 27 | 2 | 5.9 |
| Example 28 | 3 | 6.5 |
| Example 29 | 5 | 6.8 |
| Example 30 | 10 | 7.9 |

Films for protein binding studies were prepared by pressing several grams of the polymer blend between chrome plates at a pressure of 20,000 psi (1400 Kg/cm$^2$) and a temperature of 200° C.

The ability of films prepared from the blends of Examples 26–30 to bind human IgG was determined using the procedure described above. The results are shown in Table 15 below.

TABLE 15

Human IgG Binding Results (chloride/sulfate)

| Sample | Bound Protein ($\mu g/cm^2$) | % SDS Resistance | Coupled Protein ($\mu g/cm^2$) |
|---|---|---|---|
| PMMA Control | 1.91/1.51 | 16/15 | 0.30/0.22 |
| Example 26 | 1.70/1.36 | 48/44 | 0.81/0.60 |
| Example 27 | 1.46/1.33 | 57/55 | 0.83/0.73 |
| Example 28 | 1.62/1.15 | 64/65 | 1.03/0.75 |
| Example 29 | 1.46/1.18 | 63/64 | 0.91/0.76 |
| Example 30 | 1.42/1.11 | 79/76 | 1.13/0.85 |

Examples 31–35: Higher Molecular Weight PVDM Melt Blended with PMMA Using a Brabender Mixer PMMA (Rohm & Haas VM100) was blended with PVDM homopolymer having a $M_N$=34,600 in a Brabender mixer at 200° C. The blend compositions and melt flow index values (200° C.; 7.4 Kg) are shown in Table 16 below.

TABLE 16

PMMA/PVDM ($M_N$ = 34,600) Blends

| Sample | % PVDM | Melt Flow Index (g/10 min) |
|---|---|---|
| PMMA Control | 0 | 5.4 |
| Example 31 | 1 | 5.4 |
| Example 32 | 2 | 5.3 |
| Example 33 | 3 | 5.5 |
| Example 34 | 5 | 5.9 |
| Example 35 | 10 | 5.5 |

Films for protein binding studies were prepared as described for Examples 26–30.

The ability of films prepared from the blends of Examples 31–15 to bind human IgG was determined using the procedure described above. The results are shown in Table 17 below.

TABLE 17

Human IgG Binding Results (chloride/sulfate)

| Sample | Bound Protein ($\mu g/cm^2$) | % SDS Resistance | Coupled Protein ($\mu g/cm^2$) |
|---|---|---|---|
| PMMA Control | 1.73/1.40 | 13/13 | 0.22/0.18 |
| Example 31 | 1.51/1.12 | 37/38 | 0.57/0.43 |
| Example 32 | 1.49/1.24 | 36/27 | 0.54/0.34 |
| Example 33 | 1.47/1.27 | 48/32 | 0.70/0.40 |
| Example 34 | 1.45/1.16 | 53/40 | 0.77/0.46 |
| Example 35 | 1.24/1.10 | 64/61 | 0.80/0.66 |

Examples 36–40: Very Low Molecular Weight PVDM Melt Blended with PMMA Using a Brabender Mixer PMMA (Rohm & Haas VM100) was blended with PVDM homopolymer having a $M_N$=4000 in a Brabender mixer at 200° C. The blend compositions and melt index values (conditions: 200° C.; 7.4 Kg) are shown in Table 18 below.

TABLE 18

PMMA/PVDM ($M_N$ = 4,000) Blends

| Sample | % PVDM | Melt Flow Index (g/10 min) |
|---|---|---|
| PMMA Control | 0 | 5.4 |
| Example 36 | 1 | 5.2 |

TABLE 18-continued

PMMA/PVDM ($M_N$ = 4,000) Blends

| Sample | % PVDM | Melt Flow Index (g/10 min) |
|---|---|---|
| Example 37 | 2 | 5.4 |
| Example 38 | 3 | 5.8 |
| Example 39 | 5 | 6.4 |
| Example 40 | 10 | 8.6 |

Films for protein binding studies were prepared as described for Examples 26–30.

The ability of films prepared from the blends of Examples 36–40 to bind human IgG was determined using the procedure described above. The results are shown in Table 19 below.

TABLE 19

Human IgG Binding Results (chloride/sulfate)

| Sample | Bound Protein (μg/cm²) | % SDS Resistance | Coupled Protein (μg/cm²) |
|---|---|---|---|
| PMMA Control | 1.54/0.94 | 7/8 | 0.11/0.07 |
| Example 36 | 1.41/0.95 | 37/37 | 0.51/0.35 |
| Example 37 | 1.36/0.87 | 61/57 | 0.83/0.50 |
| Example 38 | 1.27/0.84 | 70/62 | 0.89/0.52 |
| Example 39 | 1.26/0.81 | 74/68 | 0.94/0.56 |
| Example 40 | 1.07/0.84 | 90/87 | 0.96/0.73 |

Example 41: MMA-co-VDM Copolymer Melt Blended with PMMA Using a Brabender Mixer

Monomeric methylmethacrylate (MMA, 13.0 g), 13.0 g of monomeric VDM, and 0.125 g AIBN were combined then added dropwise over a period of 3.5 hours to 75 g of toluene maintained at 75° C. After the addition, the temperature was raised to 85° C. for 4 hours. The resulting polymer solution was poured into 3–4 volumes of hexane. The precipitated polymer was collected by filtration and dried under vacuum at 50°–60° C. overnight. A 4.0 g portion of the resulting methylmethacrylate-vinyl dimethylazlactone copolymer was blended with 36 g of PMMA (Rohm & Haas VO44) in a Brabender mixer, equipped as described above, at 200° C. at 55 rpm for 2 minutes. Films for protein binding studies were prepared by pressing several grams of the blend between TEFLON™ coated aluminum sheets at 5,000 psi (350 Kg/cm²) and 200° C.

The ability of films prepared from the blend of Example 41 to bind Protein A and human IgG was determined using the procedures described above. The results are shown in Table 20 below.

TABLE 20

Protein Binding Results (chloride/sulfate)

| Sample | Bound Protein (μg/cm²) | % SDS Resistance | Coupled Protein (μg/cm²) |
|---|---|---|---|
| Protein A | | | |
| PMMA Control | 0.19/0.19 | 18/14 | 0.03/0.03 |
| Example 41 | 0.26/0.34 | 69/73 | 0.18/0.25 |
| Human IgG | | | |
| PMMA Control | 1.35/1.38 | 30/26 | 0.41/0.36 |
| Example 41 | 1.11/1.38 | 56/50 | 0.62/0.66 |

Examples 42–47: PS-g-VDM Graft Copolymers Melt Blended with Various Thermoplastic Polymers PS-g-VDM was prepared according to Example 10 described in European Patent Publication 0 392 783.

The PS-g-VDM was used to prepare blends with several thermoplastic resins: styrene-acrylonitrile copolymer (SAN; LUSTRAN™ 31 from Monsanto), polyurethane (PUR; PELLETHANE™ 2363–80A from Dow), a modified polyphenylene oxide (PPO; NORYL™ HP 41 from GE), an engineering thermoplastic (VALOX™ HP 200 from GE), polyoxymethylene (POM; DELRIN™ II from DuPont) and a fluoroelastomer (TEFZEL™ from DuPont). The PS-g-VDM was dry blended with the thermoplastic resin, the dry blend was melt processed in a Baker-Perkins twin screw extruder and the resulting blend was pelletized. The blend compositions and process conditions are shown in Table 21 below. Percentages are by weight. Comparative blends were prepared by blending ungrafted polystyrene with the thermoplastic resin.

TABLE 21

Blend Compositions

| Example | Base Resin | % PS | % PS-g-VDM | Melt Temp (°C.) |
|---|---|---|---|---|
| 42 | SAN | 0 | 25 | 220 |
| SAN/PS | SAN | 25 | 0 | 220 |
| 43 | PUR | 0 | 25 | 200 |
| PUR/PS | PUR | 25 | 0 | 200 |
| 44 | PPO | 0 | 25 | 220 |
| PPO/PS | PPO | 25 | 0 | 220 |
| 45 | VALOX | 0 | 25 | 230 |
| VALOX/PS | VALOX | 25 | 0 | 230 |
| 46 | POM | 0 | 25 | 175 |
| POM/PS | POM | 25 | 0 | 175 |
| 47 | TEFZEL | 0 | 25 | 260 |
| TEFZEL/PS | TEFZEL | 25 | 0 | 260 |

Films for protein binding studies were prepared by pressing several grams of the polymer blend between chrome-plated aluminum plates at a pressure of 41.4 kPa and a temperature of 200° C.

The ability of films prepared from the blends shown in Table 21 to bind Protein A and/or human IgG was determined using the procedures described above. The results are shown in Tables 22 and 23 below.

TABLE 22

Protein A Binding Results (chloride/sulfate)

| Sample | Bound Protein (μg/cm²) | % SDS Resistance | Coupled Protein (μg/cm²) |
|---|---|---|---|
| Example 42 | 1.91/1.13 | 26/19 | 0.50/0.22 |
| SAN/PS | 2.07/0.98 | 14/12 | 0.29/0.12 |
| SAN | 2.20/1.14 | 11/12 | 0.25/0.13 |
| Example 43 | 0.16/0.24 | 34/62 | 0.05/0.15 |
| PUR/PS | 0.17/0.26 | 28/39 | 0.05/0.10 |
| PUR | 0.21/0.28 | 35/38 | 0.07/0.11 |
| Example 44 | 0.23/0.26 | 45/46 | 0.10/0.12 |
| PPO/PS | 0.23/0.22 | 44/31 | 0.10/0.07 |
| PPO | 0.21/0.22 | 44/32 | 0.09/0.07 |
| Example 45 | 0.24/0.21 | 17/16 | 0.04/0.04 |
| VALOX/PS | 0.26/0.19 | 12/15 | 0.03/0.03 |
| VALOX | 0.28/0.26 | 16/16 | 0.04/0.04 |
| Example 46 | 0.40/0.35 | 30/45 | 0.12/0.16 |
| POM/PS | 0.40/0.32 | 21/21 | 0.08/0.07 |
| POM | 0.30/0.26 | 7/21 | 0.08/0.05 |
| Example 47 | 0.35/0.31 | 23/31 | 0.08/0.09 |
| TEFZEL/PS | 0.42/0.35 | 12/11 | 0.05/0.04 |
| TEFZEL | 0.29/0.19 | 12/9 | 0.04/0.02 |

TABLE 23

Human IgG Binding Results (chloride/sulfate)

| Sample | Bound Protein (μg/cm²) | % SDS Resistance | Coupled Protein (μg/cm²) |
|---|---|---|---|
| Example 42 | 0.49/0.48 | 33/32 | 0.16/0.16 |
| SAN/PS | 0.47/0.49 | 25/24 | 0.12/0.12 |
| SAN | 0.43/0.46 | 22/22 | 0.09/0.10 |
| Example 43 | 0.49/0.49 | 60/60 | 0.29/0.29 |
| PUR/PS | 0.50/0.48 | 21/13 | 0.11/0.06 |
| PUR | 0.65/0.59 | 14/11 | 0.09/0.06 |
| Example 44 | 0.45/0.44 | 33/31 | 0.15/0.14 |
| PPO/PS | 0.43/0.42 | 25/24 | 0.11/0.10 |
| PPO | 0.46/0.48 | 29/28 | 0.13/0.14 |
| Example 45 | 0.57/0.57 | 20/22 | 0.12/0.12 |
| VALOX/PS | 0.67/0.54 | 16/19 | 0.10/0.10 |
| VALOX | 0.60/0.55 | 14/17 | 0.08/0.10 |
| Example 46 | 0.92/1.19 | 28/34 | 0.25/0.41 |
| POM/PS | 1.17/1.39 | 25/24 | 0.30/0.33 |
| POM | 1.00/1.46 | 26/29 | 0.26/0.43 |

TABLE 24

| | RPM | Percent Initiator | Throughput (g/min) |
|---|---|---|---|
| Comparison Ex. 48 | 180 | 0.5 | 60 |
| Comparison Ex. 49 | 100 | 0.5 | 30 |
| Example 50 | 200 | 0.25 | — |
| Example 51 | 100 | 0.25 | — |
| Example 52 | 100 | 0.5 | — |
| Example 53 | 200 | 0.5 | — |
| Example 54 | 100 | 0.75 | — |
| Example 55 | 200 | 0.75 | — |

From Table 24 it is seen that vinyldimethylazlactone can be polymerized using a twin-screw extruder, even though residence time or reaction time was quite short in duration (about 2–4 minutes). The use of reduced temperature zones and starved feeding reduced premature polymerization.

Examples 56–155

The following abbreviation chart shows the materials used for Examples 56–155 and their commercial source.

| Material | Chemical Name | Trade Name/No./Prop. | Company |
|---|---|---|---|
| PMMA | Poly(methyl methacrylate) | VM100 (Injection Moldable Grade) | Rohm & Haas |
| PE | Poly(ethylene) | PE9205 (Fract. Melt Flow) | Hoechtz |
| PP | Poly(propylene) | PP6723 Profax (Fract. Melt Flow) | HiMont |
| PP | Poly(propylene) | PP3860 (Melt Flow Index 50) | Fina |
| PS | Poly(styrene) | PS685 Stryon (Inj. Mold. Grade) | Dow Chem. |
| VAZO-52 | 2,2'-Azobis(2,4-Dimethylpentanenitrile) | VAZO 52 (Free Rad. Initiator) | DuPont |
| AIBN | 2,2'-Azobis(2-Methylpropanenitrile) | VAZO 64 (Free Rad. Initiator) | DuPont |
| PVDM | Poly(vinyldimethylazlactone) | Description of various lots below | |

Comparison Examples 48 and 49 and Examples 50–55: Polymerization of Vinyldimethylazlactone in First Step of Two-Step Process The polymerization was carried out in a Leistritz 34 mm, 35:1 L/D counter rotating twin-screw extruder (Leistritz™ model LSM 30.34GG, Nuremburg, Germany) and corresponding to FIG. 2 except that no positive displacement pump nor adjuvant was used. Lupersol 101 peroxide initiator was dissolved in VDM monomer. The monomer was purged with nitrogen and placed in a kettle 22, pressurized with nitrogen to about 0.7 kg/cm² [10 psi]. The monomer was fed into the feed throat of the extruder and Table 24 shows the conditions used for both Comparison Examples 48 and 49 and Examples 50–55. For Comparison Examples 48 and 49, the monomer was flood fed into the feed throat of the extruder with all zones heated to 150° C. and the block and die pump heated to 180° C., and it appeared that polymerization occurred at the entrance to the first zone of the extruder forming a partial seal and causing a reduction in throughput. In Examples 50–55, the first zone was run cooler at 50° C. and the second zone was run at 100° C. (all other zones and block and die pump otherwise unchanged), and the monomer was starve fed into the extruder. The polymer formed was extruded through a strand die, quenched on a bed of dry ice, and pelletized. Polymerization was successful. The polymer formed is clear, brittle, and yellow in color.

Poly(vinyldimethyl azlactone) (PVDM) Preparation

Examples 56–58: Solution Polymerized PVDM

For Example 56, white PVDM powder was solution polymerized with 0.5wt % 2,2'-Azobisisobutyronitrile (AIBN, VAZO 64) in tetrahydrofuran. The polymer was precipitated in heptane and dried in a vacuum oven. The number average molecular weight ($M_n$) was 11,000.

The PVDM for Example 57 was prepared by high temperature, solution polymerization in toluene. The samples were highly viscous, yellow resins with $M_n$ around 11,000.

PVDM for Example 58 was prepared by solution polymerization in a 35% solids mixture of methyl ethyl ketone and triethyl silane using VAZO-64 as the initiator. Various lots with $M_n$ ranging from 12,000 to 23,000 were obtained by adjusting the wt % of VAZO-64.

Example 59: Bulk Polymerized PVDM

The following example demonstrates the bulk polymerization of VDM in a 34 mm Leistritz counter-rotating, twin screw extruder. Variations were made in the type of initiator, initiator amount, temperature, the effect of vacuum, and amount of adjuvant. The initiator types studied were VAZO-64 (AIBN) and VAZO-52. The adjuvant was isopropyl alcohol (IPA).

The process scheme is outlined in FIG. 1. The initiator or combination of initiators were dissolved in the VDM monomer. The monomer batch was then purged with $N_2$ and stored in an ice bath. The monomer stream was fed at 53 g/min into the cooled feed throat of the extruder. The adjuvant was fed into the same throat by using a Ruska positive displacement pump at various flow rates. The temperatures in the zones were set at 50° C. in the first zone, 100° C. in the second zone, and 150° C. in the remaining zones, except for Examples 59c-59i where the temperature after the second zone was 180° C. Zone 6 contained a vacuum port to vent off residual monomer and adjuvant. A gear pump was used at the end of the extruder to eliminate surging and produce a continuous strand of material. The polymer was quenched in a Fluorinert® heat transfer liquid bath with dry ice and pelletized.

TABLE 25

Process conditions for Examples 59a–59q

| Example # | Initiator (wt %) | IPA (wt %) | Temp (°C.) | Vacuum | Residual (%) | Mn |
|---|---|---|---|---|---|---|
| 59a | 0.5 | 0 | 150 | No | 11.70 | 28,200 |
| 59b | 0.5 | 0.96 | 150 | No | 11.55 | 28,600 |
| 59c | 0.5 | 1.94 | 150 | No | 12.64 | 27,900 |
| 59d | 0.5 | 0 | 180 | No | 9.43 | 24,900 |
| 59e | 0.5 | 1.94 | 180 | No | 8.71 | 24,000 |
| 59f | 0.5 | 0.96 | 180 | No | 9.55 | 23,100 |
| 59g | 0.5 | 1.94 | 180 | Yes | 5.93 | 23,700 |
| 59h | 0.75 | 0.96 | 180 | Yes | 7.06 | 19,400 |
| 59i | 0.75 | 1.94 | 180 | Yes | 5.93 | 18,300 |
| 59j | 0.5 | 0.45 | 150 | Yes | NA | 29,400 |
| 59k | 0.5 | 0.45 | 150 | Yes | 12.55 | 29,100 |
| 59l | 0.5 | 1.79 | 150 | Yes | 10.60 | 30,800 |
| 59m | 0.5 | 3.1 | 150 | Yes | NA | 27,600 |
| 59n | 0.5 | 4.5 | 150 | Yes | 8.98 | 27,000 |
| 59o | 0.75 | 4.5 | 150 | Yes | 9.80 | 24,100 |

TABLE 25-continued

Process conditions for Examples 59a–59q

| Example # | Initiator (wt %) | IPA (wt %) | Temp (°C.) | Vacuum | Residual (%) | Mn |
|---|---|---|---|---|---|---|
| 59p* | 1.0 | 4.5 | 150 | Yes | 9.95 | 20,500 |
| 59q** | 0.75 | 4.5 | 150 | Yes | 8.79 | 19,300 |

*VAZO 52?
**VAZO 64/52
all others: VAZO 64
NA = not available

Example 60: Bulk Polymerized PVDM

From the results of the Example 59, Example 60 considered the feasibility of using a combination of initiators to lower the molecular weight and reduce the level of residuals. The process scheme for the bulk polymerization was the same as in Example 59 with one exception. Two consecutive vacuum ports were used to vent off any unreacted monomer or adjuvant; in Example 59, only one vacuum port had been used. The IPA concentration was maintained at 2.5 weight percent, and the extruder temperatures were set at 50° C. and 100° C. in the first two zones and thereafter at 150° C. The temperature in the melt pump was adjusted to remain in the range of 150° C.–160° C. The monomer feed rate was 37.9 g/min. Except as noted, the polymerization conditions were identical to those used in Example 59. With this slight equipment modification, the residuals decreased considerably. Generally, with the combination of initiators, lower molecular weights (Mn) were prepared. The lowest molecular weights were obtained for samples prepared with higher initiator concentrations and with higher VAZO 52 content. The process conditions are given in Table 26.

Increased vacuum venting reduced the residual VDM monomer content of the polymer. With the initiator combination of VAZO 64 and VAZO 52, the $M_n$ decreased even at the lower processing temperature. In Examples 60j–60q, VAZO-64 was replaced with VAZO-67; the decomposition byproducts of VAZO-67 are significantly less toxic than those from VAZO-64.

TABLE 26

Process conditions for Examples 60a–60q.

| Example # | Initiator (wt %) | I ratio (52/64) | IPA (wt %) | Temp (°C.) | Vacuum | Residual (%) | Mn |
|---|---|---|---|---|---|---|---|
| 60a | 1.0 | 1.48/1 | 2.5 | 150 | Yes | 5.46 | 21,500 |
| 60b | 1.2 | 0.26/1 | 2.5 | 150 | Yes | 1.33 | 15,300 |
| 60c | 1.2 | 8.58/1 | 2.5 | 150 | Yes | 3.24 | 19,100 |
| 60d | 1.78 | 1/0 | 2.5 | 150 | Yes | 1.42 | 15,400 |
| 60e | 2.56 | 1.51/1 | 2.5 | 150 | Yes | 1.46 | 11,100 |
| 60f | 2.33 | 8.58/1 | 2.5 | 150 | Yes | 1.27 | 11,900 |
| 60g | 1.27 | 1.51/1 | 2.5 | 150 | Yes | 0.68 | 16,200 |
| 60h | 2.33 | 0.26/1 | 2.5 | 150 | Yes | 0.71 | 14,000 |
| 60i | 1.78 | 0/1 | 2.5 | 150 | Yes | 0.55 | 18,800 |
| 60j* | 2.28 | 7.32/1 | 2.5 | 150 | Yes | 0.28 | 14,400 |
| 60k* | 1.0 | 1.29/1 | 2.5 | 150 | Yes | 2.63 | 21,800 |
| 60l* | 2.5 | 1.29/1 | 2.5 | 150 | Yes | 1.10 | 11,900 |
| 60m* | 1.75 | 1.34/1 | 2.5 | 150 | Yes | 1.31 | 15,400 |
| 60n* | 1.22 | 0.23/1 | 2.5 | 150 | Yes | 2.69 | 18,400 |
| 60o* | 1.22 | 0.23/1 | 5.0 | 150 | Yes | 1.10 | 21,200 |
| 60p* | 1.22 | 0.23/1 | 7.5 | 150 | Yes | 1.20 | 19,400 |
| 60q* | 2.28 | 0.23/1 | 2.5 | 150 | Yes | 0.59 | 14,600 |

*VAZO-64 replaced with VAZO-67

Example 61: VDM Homopolymerization in a Co-rotating Extruder

VDM was successfully polymerized on a Berstorff 40 mm co-rotating, twin screw extruder. A designed experiment was used to investigate the effect of different adjuvants. The reactions were performed by feeding $N_2$ purged VDM containing 1 wt % Vazo 52 to the feed throat of the extruder at a controlled flow rate of 37.9 g/min. The adjuvant was either tri-ethyl silane (TES) or carbon tetrabromide; the TES was fed to the extruder with a Gilson pump, while the $CBr_4$ was dissolved directly in the monomer. The barrel temperatures used for these experiments were 15° C. for zone 1, 60° C. for zone 2, and 100° C. for the remaining zones, with temperatures in the three zones of the melt pump set at 100° C., 110° C., and 100° C., respectively. Actual temperatures in the zones varied in each zone during the course of the homopolymerization. A single vacuum port was used in zone 8 to help remove residual monomer. The polymer was passed through a gear pump to a strand die, quenched in a Fluorinert® heat transfer liquid/dry ice bath, and then pelletized.

TABLE 27

Process conditions for Examples 61a–61i.

| Example # | Initiator (wt %) | TES (wt %) | CBr$_4$ (wt %) | Temp (°C.) | Vacuum | Residual | Mn | Amps |
|---|---|---|---|---|---|---|---|---|
| 61a | 1.0 | 0.0 | 0.0 | 100 | Yes | 7.89 | 10,500 | 23.8 |
| 61b | 1.0 | 0.0 | 0.0 | 100 | Yes | 10.7 | 9,360 | 12.0 |
| 61c | 1.0 | 0.0 | 0.0 | 100 | Yes | 8.47 | 18,200 | 13.8 |
| 61d | 1.0 | 0.34 | 0.0 | 100 | Yes | 6.61 | 20,200 | 15.7 |
| 61e | 1.0 | 0.52 | 0.0 | 100 | Yes | 6.40 | 19,400 | 12.9 |
| 61f | 1.0 | 2.57 | 0.0 | 100 | Yes | 6.24 | 19,400 | 20.4 |
| 61g | 1.0 | 0.0 | 0.1 | 100 | Yes | 4.25 | 18,600 | 11.7 |
| 61h | 1.0 | 0.0 | 0.05 | 100 | Yes | 8,95 | 19,100 | 13.5 |
| 61i | 1.0 | 0.0 | 0.15 | 100 | Yes | 5.88 | 18,700 | 18.2 |

The polymers made in the co-rotating, twin screw extruder were clear and had a slight residual monomer odor.

Examples 62–67 Blends Prepared via Brabender Mixer

A 40 g Brabender mixing head with a $N_2$ purge was heated to 180° C. A known amount of an injection moldable grade PMMA (Rohm & Haas VM100) or PS (Dow PS685) was added and mixed at 55 rpm for 2 min. PVDM, either in solid form or dissolved in THF at 35% solids, was added at various wt % to the molten polymer and mixed for an additional 4 min. Torque measurements were recorded. The blend was removed and placed in a sealed, glass jar. Tables 28 and 29 outline blends prepared on the Brabender mixer.

Blends were also prepared on the 34 mm Leistritz counter-rotating extruder and/or the 40 mm Berstorff co-rotating, twin screw extruder. The scheme for processing the blends is illustrated in FIG. 2.

Three different processes for producing PVDM polymer blends were investigated. The first process utilized a 35% solids solution of PVDM in THF. Both the high temperature polymerized PVDM prepared according to Example 57 above (Examples 69 and 70) and the PVDM powder prepared according to Example 56 (Examples 71–73 and 75) were used. The PMMA was dried at 170° F. for 8 hr and then weigh fed into a cooled feed throat. The solution of PVDM was also fed into the feed throat. Bridging of the two materials and sample color were both major problems for

TABLE 28

Brabended PMMA/PVDM blends.

| Example No. | PVDM lot | % PVDM | PMMA (g) | PVDM (g) | Solvent | Torque | Mn |
|---|---|---|---|---|---|---|---|
| Comparison 62 | None | 0 | 40.01 | 0.00 | none | 22.7 | 11,000 |
| 63a | Example 56 | 1.94 | 39.96 | 0.79 | none | 18.1 | 11,000 |
| 63b | Example 56 | 4.76 | 40.22 | 2.01 | none | 20.2 | 11,000 |
| 63c | Example 56 | 4.76 | 39.88 | 5.69 | anhy THF | 13.4 | 11,000 |
| 64a | Example 57 | 1.95 | 40.19 | 2.29 | THF | 19.4 | 11,000 |
| 64b | Example 57 | 4.76 | 40.77 | 5.82 | THF | 14.2 | 11,000 |
| 65a | Example 58 | 1.71 | 39.99 | 1.99 | mek/tesh | 13.1 | 12,300 |
| 65b | Example 58 | 1.71 | 40.37 | 2.02 | mek/tesh | 19.5 | 16,300 |
| 65c | Example 58 | 4.76 | 39.99 | 5.71 | mek/tesh | 17.5 | 18,900 |
| 65d | Example 58 | 4.76 | 40.77 | 5.82 | mek/tesh | 19.2 | 12,300 |
| 65e | Example 58 | 4.76 | 39.87 | 5.69 | mek/tesh | 19.0 | 16,300 |
| 65f | Example 58 | 4.76 | 40.31 | 8.76 | mek/tesh | 18.1 | 20,400 |
| 65g | Example 58 | 4.76 | 40.26 | 5.75 | mek/tesh | 18.6 | 23,000 |

TABLE 29

Brabended PS/PVDM blends.

| Example No. | PVDM lot | % PVDM | PS (g) | PVDM (g) | Solvent | Torque | Mn |
|---|---|---|---|---|---|---|---|
| Comparison 66 | None | 0 | 40.00 | 0.00 | none | 13.2 | NA |
| 67 | Example 59 | 1 | 40.00 | 0.40 | none | 14.1 | 27,000 |
| 67 | Example 59 | 3 | 40.00 | 1.20 | none | 14.7 | 27,000 |
| 67 | Example 59 | 5 | 40.00 | 2.00 | none | 14.2 | 27,000 |

Examples 68–93 Blends Prepared on the 34 mm or 40 mm Twin Screw Extruders (With Examples 68, 74, 76, 79, 82, and 87 as Comparison Examples)

this process. In order to extrude the blend on the 34 mm Leistritz extruder, a processing temperature above 210° C. was required. Azlactone functional compounds discolor at or above this temperature. The 40 mm Berstorff co-rotating extruder has much more power than the Leistritz. As a result, the processing temperature for this extruder in center zones was 180° C., and the materials appeared clear.

The second process utilized the same PVDM solution lots (Examples 77–81) but fed them into zone 3 of the extruder. This eliminated the problem of bridging in the feed. However, zone 3 was not cooled. By the time the solution reached the barrel where the temperature was above 70° C., the solvent volatilized, and solid PVDM built up on the tip of the feed line and injection port.

The third process completely eliminated the use of solvent. PVDM batches prepared by extrusion polymerization as described in Example 60 (Examples 88–90) were used in pelletized form and fed into the cooled feed port with a small vibratory feeder. PMMA was gravimetrically fed into the same port; bridging was not a problem with this process. Powdered PVDM as described in Example 56 (Examples 91–93) was also conveyed by a vibratory feeder at different rates to produce a PMMA/PVDM blend. Table 30 summarizes the process conditions and blend compositions investigated.

except 20° C. in the first zone; Examples 84–86: same as Example 81, except 50° C. in the first zone, 70° C. in the second zone, and 205° C. in the melt pump; and Examples 87–93: same as Example 81 except 15° C. in the first zone, 70° C. in the second zone, 100° C. in the third zone, and 205° C. in the melt pump.

The following temperatures were measured, (to demonstrate some variation during processing occurs): Example 76: sequentially 25° C., 183° C., 180° C., 180° C., 180° C., 170° C., 180° C., 177° C., 185° C., 195° C., 201° C., and 206° C. with all three zones in the melt pump measured at 210° C.; Example 77: sequentially 25° C., 172° C., 182° C., 183° C., 167° C., 181° C., 177° C., 183° C., 196° C., 199° C., and 205° C. with 246° C. in the melt pump; Example 78: sequentially 25° C., 170° C., 180° C., 180° C., 181° C., 180° C., 178° C., 185° C., 196° C., 200° C., and 205° C. with 210° C. in the melt pump; Example 79: sequentially 25° C., 171° C., 181° C., 179° C., 179° C., 181° C., 180° C., 185° C., 195° C., 200° C., and 206° C. with 210° C. in the melt pump; and Example 80: sequentially 25° C., 169° C., 180° C., 182° C., 178° C., 178° C., 180° C., 184° C., 195° C., 200° C., and 204° C. with 210° C. in the melt pump.

TABLE 30

Extruded compositions and process conditons for PVDM blends.

| Example No. | Blend | Wt % PVDM | Lot PVDM | Process T (°C.) | AMPS |
|---|---|---|---|---|---|
| 68-L | PMMA | 0 | | 210 | 13.9 |
| 69-L | PMMA/PVDM | 2 | Example 57 | 210 | 15.0 |
| 70-L | PMMA/PVDM | 2 | Example 57 | 210 | 12.4 |
| 71-L | PMMA/PVDM | 2 | Example 56 | 210 | 12.8 |
| 72-L | PMMA/PVDM | 2 | Example 56 | 210 | 13.0 |
| 73-L | PMMA/PVDM | 2 | Example 56 | 210 | 12.8 |
| 74-L | PP3860 | 0 | | 165 | 9.4 |
| 75-L | PP3860/PVDM | 2 | Example 56 | 165 | 9.4 |
| 76-B | PE9255 | 0 | Example 57 | 1800 | 50 |
| 77-B | PE9255/PVDM | 2.5 | Example 57 | 180 | 31 |
| 78-B | PE9255/PVDM | 5 | Example 57 | 180 | 33 |
| 79-B | PP6723 | 0 | Example 57 | 180 | 25 |
| 80-B | PP6723/PVDM | 5 | Example 57 | 180 | 26 |
| 81-B | PP6723/PVDM | 2.5 | Example 57 | 180 | 26 |
| 82-B | PMMA | 0 | | 180 | 90 |
| 83-B | PMMA/PVDM | 2 | Example 56 | 180 | 50 |
| 84-B | PMMA/PVDM | 2 | Example 56 | 180 | 50 |
| 85-B | PMMA/PVDM | 5 | Example 56 | 180 | 50 |
| 86-B | PMMA/PVDM | 7.5 | Example 56 | 180 | 50 |
| 87-B | PMMA | 0 | | 180 | 45 |
| 88-B | PMMA/PVDM | 2 | Example 60 | 180 | 71 |
| 89-B | PMMA/PVDM | 5 | Example 60 | 180 | 69 |
| 90-B | PMMA/PVDM | 7 | Example 60 | 180 | 67 |
| 91-B | PMMA/PVDM | 2 | Example 56 | 180 | 74 |
| 92-B | PMMA/PVDM | 5 | Example 56 | 180 | 76 |
| 93-B | PMMA/PVDM | 7 | Example 56 | 180 | 66 |

L or B after sample # represents L = 34 mm Leistritz extruder or B = 40 mm Berstorff extruder.

The following temperatures in successive zones were set: Examples 68–73: all zones 210° C.; Examples 74–75: all zones 165° C., except the last zone at 160° C.; Example 81: sequentially 25° C., 170° C., 180° C. (through next six zones), 195° C., 200° C., and 205° C. with 210° C. in the melt pump; Examples 82 and 83: same as Example 81, Comparison Example 94 and Examples 95–106 Protein Binding for Blends Examples 63–65 Prepared with PVDM from Examples 56–58.

Table 31 shows the results of protein binding on blends from Comparison Example 62 and Examples 63–65 with PVDM from Examples 56–58.

TABLE 31

Protein binding for blends prepared with Examples 56–58.

| Example No. | Blend Example | Sample Type | PVDM Type | Bound Protein (µg/cm²) NaCl Na₂SO₄ | SDS Resistance (%) ClSO₄ | Coupled Protein in NaCl (µg/cm²) | Coupled Protein in Na₂SO₄ (µg/cm²) |
|---|---|---|---|---|---|---|---|
| Comparison 94 | Comparison 62 | PMMA Control | none | 0.60 / 0.42 | 5 ± 1 / 7 ± 2 | 0.03 ± .01 | 0.03 ± .01 |
| 95 | 63a | 1.94% PVDM | Example 56 | 0.60 / 0.32 | 10 ± 4 / 31 ± 10 | 0.06 ± .03 | 0.10 ± .03 |
| 96 | 63b | 4.76% PVDM | Example 56 | 0.35 / 0.33 | 17 ± 10 / 30 ± 11 | 0.06 ± .03 | 0.10 ± .04 |
| 99 | 63c | 4.76% PVDM | Example 56 | 0.43 / 0.31 | 46 ± 6 / 63 ± 7 | 0.20 ± .01 | 0.20 ± .04 |
| 96 | 64a | 1.95% PVDM | Example 57 | 0.50 / 0.38 | 38 ± 4 / 42 ± 8 | 0.19 ± .01 | 0.16 ± .04 |
| 98 | 64b | 4.76% PVDM | Example 57 | 0.41 / 0.37 | 51 ± 5 / 52 ± 7 | 0.21 ± .06 | 0.19 ± .02 |
| 100 | 65a | 1.71% PVDM | Example 58 | 0.65 / 0.34 | 26 ± 6 / 44 ± 1 | 0.17 ± .05 | 0.15 ± .01 |
| 101 | 65b | 1.71% PVDM | Example 58 | 0.60 / 0.38 | 28 ± 4 / 40 ± 11 | 0.17 ± .02 | 0.15 ± .04 |
| 102 | 65c | 1.71% PVDM | Example 58 | 0.58 / 0.26 | 48 ± 6 / 46 ± 6 | 0.28 ± .003 | 0.12 ± .02 |
| 103 | 65d | 4.76% PVDM | Example 58 | 0.59 / 0.39 | 39 ± 12 / 46 ± 13 | 0.23 ± .08 | 0.18 ± .04 |
| 104 | 65e | 4.76% PVDM | Example 58 | 0.52 / 0.40 | 50 ± 6 / 57 ± 4 | 0.26 ± .05 | 0.23 ± .01 |
| 105 | 65f | 5.0% PVDM | Example 58 | 0.59 / 0.27 | 37 ± 4 / 51 ± 7 | 0.22 ± .01 | 0.14 ± .02 |
| 106 | 65g | 5.0% PVDM | Example 58 | 0.52 / 0.28 | 54 ± 4 / 64 ± .4 | 0.28 ± .004 | 0.18 ± .004 |

Comparison Example 107 and Examples 108–113 Quenching Effects

Quenching the polymer blends in a Fluorinert® heat transfer liquid/dry ice bath improved the protein binding and SDS resistance of the blends slightly. More importantly, a Fluorinert® heat transfer bath with a small amount of dry ice facilitated the pelletizing process. A water bath was unsatisfactory since the water can open the azlactone ring and deactivate the polymer. Table 32 shows the results for Comparison Example 107 and Examples 108–113.

The protein binding and SDS resistance for the polymer blends prepared in the Brabender from Bulk Polymerized PVDM of Examples 59 and 60 were generally higher than for blends prepared from solution polymerizated PVDM. These trends are shown in Tables 33 and 34 for Comparison Examples 114, 115 and Examples 116–132 for blends of PVDM from Example 59 and for Comparison Example 137 and Examples 134–142 for blends of PVDM from Example 60 blended using a Brabender Mixer and Example 143 and

TABLE 32

The Effect of Quenching on Protein Binding for PMMA blends.

| Example No. | Quench Type | PVDM Type | Bound Protein (µg/cm²) in NaCl | Cl SDS Resistance (%) | Coupled Protein (µg/cm²) in NaCl | PVDM Mn |
|---|---|---|---|---|---|---|
| Comp. 107 | dry ice | None | 1.86 | 7.38 ± 1.6 | 0.137 ± .022 | |
| 108 | dry ice | Example 56 | 0.44 | 31.1 ± 3.3 | .0510 ± .057 | 11,000 |
| 109 | dry ice | Example 56 | 1.67 | 19.6 ± 5.3 | 0.328 ± .102 | 11,000 |
| 110 | dry ice | Example 56 | 1.57 | 20.3 ± 4.1 | 0.320 ± .071 | 11,000 |
| 111 | Fluorinert liquid/dry ice | Example 56 | 1.56 | 27.9 ± 3.7 | 0.423 ± .040 | 11,000 |
| 112 | Fluorinert liquid/dry ice | Example 56 | 1.52 | 31.4 ± 1.1 | 0.479 ± .012 | 11,000 |
| 113 | Fluorinert liquid/dry ice | Example 56 | 1.39 | 31.6 ± 0.7 | 0.440 ± .001 | 11,000 |

Comparison Examples 114, 115, 133, 144 and Examples 116–132 and 134–143 Protein Binding Effects for Bulk Polymerized PVDM from Examples 59 and 60.

Comparison Example 144 blended using a 40 mm Berstorff extruder.

TABLE 33

Protein binding of 5% PVDM/PMMA blends with PVDM from Example 59.

| Example No. | PVDM type | Bound Protein in NaCl (μg/cm²) | Cl SDS Resistance (%) | Coupled Protein in NaCl (μg/cm²) | PVDM Mn | Color Ranking (1 = clearest) |
|---|---|---|---|---|---|---|
| Comparison 114 | PMMA-1 | 1.85 | 7.4 ± 1.6 | 0.137 ± .022 | | |
| Comparison 115 | PMMA-2 | 5.22 | 9 ± 3 | 0.47 ± .18 | | |
| 116 | 59a | 1.57 | 54.2 ± 8.7 | 0.853 ± .068 | 28,200 | 2 |
| 117 | 59b | 1.63 | 47.2 ± 3.4 | 0.771 ± .044 | 28,600 | 8 |
| 118 | 59c | 1.62 | 54.4 ± 0.2 | 0.883 ± .048 | 27,900 | 16 |
| 119 | 59d | 1.60 | 50.0 ± 5.7 | 0.804 ± .074 | 24,900 | 10 |
| 120 | 59e | 1.61 | 50.6 ± 10.0 | 0.813 ± .175 | 24,000 | 11 |
| 121 | 59f | 1.78 | 32.7 ± 3.7 | 0.581 ± .039 | 23,100 | 9 |
| 122 | 59g | 1.78 | 38.2 ± 2.0 | 0.680 ± .048 | 23,700 | 3 |
| 123 | 59h | 1.64 | 43.1 ± 2.6 | 0.707 ± .074 | 19,400 | 6 |
| 124 | 59i | 1.52 | 43.8 ± 4.8 | 0.664 ± .063 | 18,300 | 7 |
| 125 | 59j | 1.69 | 40.2 ± 4.3 | 0.683 ± .068 | 29,400 | 1 |
| 126 | 59k | 1.55 | 49.4 ± 6.5 | 0.768 ± .046 | 29,100 | 4 |
| 127 | 59l | 1.59 | 42.2 ± 1.3 | 0.670 ± .008 | 30,800 | 5 |
| 128 | 59m | 1.60 | 51.1 ± 3.1 | 0.818 ± .055 | 27,600 | 12 |
| 129 | 59n | 1.74 | 46.1 ± 3.7 | 0.800 ± .045 | 27,000 | 17 |
| 130 | 59o | 1.42 | 50.1 ± 5.1 | 0.709 ± .066 | 24,100 | 13 |
| 131 | 59p | 1.59 | 49.3 ± 7.4 | 0.782 ± .129 | 20,500 | 14 |
| 132 | 59q | 1.63 | 44.2 ± 3.6 | 0.719 ± .039 | 19,300 | 15 |

TABLE 34

Protein Binding for 5% PVDM/PMMA blends with PVDM from Example 60.

| Example No. | Sample No. | Type PVDM | Bound Protein (μg/cm²) in NaCl | Cl SDS Resistance (%) | Coupled Protein (μg/cm²) | PVDM Mn |
|---|---|---|---|---|---|---|
| Comparison 133 | PMMA Control | — | 4.88 | 8 ± 4 | 0.39 ± 0.19 | — |
| 134 | 5% PVDM/PMMA | 60a | 4.23 | 40 ± 2 | 1.69 ± 0.10 | 21,500 |
| 135 | 5% PVDM/PMMA | 60b | 3.91 | 56 ± 2 | 2.19 ± 0.14 | 15,300 |
| 136 | 5% PVDM/PMMA | 60c | 4.46 | 41 ± 5 | 1.83 ± 0.10 | 19,100 |
| 137 | 5% PVDM/PMMA | 60d | 4.15 | 40 ± 14 | 1.66 ± 0.44 | 15,400 |
| 138 | 5% PVDM/PMMA | 60e | 4.28 | 40 ± 1 | 1.71 ± 0.06 | 11,100 |
| 139 | 5% PVDM/PMMA | 60f | 4.31 | 52 ± 4 | 2.24 ± 0.08 | 11,900 |
| 140 | 5% PVDM/PMMA | 60g | 4.22 | 41 ± 1 | 1.73 ± 0.03 | 16,200 |
| 141 | 5% PVDM/PMMA | 60h | 3.68 | 57 ± 3 | 2.10 ± 0.05 | 14,000 |
| 142 | 5% PVDM/PMMA | 60i | 4.35 | 40 ± 3 | 1.74 ± 0.02 | 18,800 |
| 143 | 2.5% PVDM/PMMA | 60j | 4.08 | 63 ± 4 | 0.68 ± 0.10 | 14,400 |
| Comparison 144 | PMMA Control for Ex. 143 | — | 1.44 | 18 ± 0.03 | 0.25 ± 0.05 | — |

Comparison Example 145 and Examples 146–154 Protein Binding Effects for Bulk Polymerized PVDM for Example 61.

The samples produced according to Example 61 had significantly lower molecular weights and levels of residual monomer. The bioactivity of blends made from these polymers was also substantially higher.

PVDM from Example 61 was blended with PMMA on the Berstorff extruder in the solvent-free process described above in Examples 76–93. The temperatures were set sequentially at 15° C., 130° C., 150° C., 180° C., 180° C., 180° C., 180° C., 185° C., 195° C., 200° C., and 205° C., and 205° C. in the melt pump. The flow rate was 37.9 g/min (except for Example 144 where the flow rate was 49.4 g/min). The protein binding results for these blends are given in Table 35 for Comparison Example 143 and Examples 144–151. These blends contained only 2.5% PVDM.

TABLE 35

Protein Binding for 2.5% PVDM/PMMA blends from Example 61.

| Example No. | Sample No. | Type of PVDM | Bound Protein (μg/cm$^2$) in NaCl | Cl SDS Resistance (%) | Coupled Protein (μg/cm$^2$) | PVDM Mn | Amps |
|---|---|---|---|---|---|---|---|
| Comparison 143 | PMMA Control | | 2.12 ± 0.35 | 25 ± 8 | 0.55 ± 0.24 | | 41 |
| 143 | 2.5% PVDM/PMMA | 61a | 1.46 ± 0.54 | 60 ± 2 | 0.87 ± 0.31 | 10,500 | 45 |
| 144 | 2.5% PVDM/PMMA | 61b | 1.66 ± 0.24 | 53 ± 3 | 0.87 ± 0.08 | 9,360 | 45 |
| 145 | 2.5% PVDM/PMMA | 61c | 166 ± 0.18 | 52 ± 4 | 0.87 ± 0.12 | 18,200 | 46 |
| 146 | 2.5% PVDM/PMMA | 61d | 1.56 ± 0.09 | 58 ± 6 | 0.90 ± 0.13 | 20,200 | 47 |
| 147 | 2.5% PVDM/PMMA | 61e | 1.76 ± 0.97 | 63 ± 6 | 1.07 ± 10.47 | 19,400 | 45 |
| 148 | 2.5% PVDM/PMMA | 61f | 1.51 ± 0.68 | 71 ± 1 | 1.08 ± 0.49 | 19,400 | 44 |
| 149 | 2.5% PVDM/PMMA | 61g | 1.59 ± 0.24 | 50 ± 10 | 0.80 ± 0.26 | 18,600 | 49 |
| 150 | 2.5% PVDM/PMMA | 61h | 1.60 ± 0.06 | 66 ± 2 | 1.05 ± 0.04 | 19,100 | 43 |
| 151 | 2.5% PVDM/PMMA | 61i | 1.38 ± 0.30 | 67 ± 1 | 0.92 ± 0.20 | 18,700 | 47 |

The blends prepared with bulk polymerized PVDM according to Examples 59 through 61 had consistently superior protein binding and SDS resistance than blends prepared with PVDM dissolved in solvent according to Examples 56–58. Coupled Protein for PMMA/PVDM blends containing as little as 2.5 PVDM significantly exceeded coupled protein for PMMA alone. Solid or pellet conveying eliminated the use of solvent and significantly reduced the variability in feeding PVDM with thermoplastic polymers. As a result, improved and consistent protein binding results were obtained.

COMPARISON EXAMPLES 152 AND 154 AND EXAMPLES 153 AND 155: DETERMINATION OF PERCENT HAZE AND COLOR

Samples of 100% PMMA (as Comparison Example 152 and 154) and a 95% PMMA/5% PVDM blend of the invention (as Examples 153 and 155) were measured for percent haze according to ASTM method D1003 (incorporated herein by reference) and for color according to ASTM method E308 (incorporated herein by reference). Samples of Example 153 and Example 155 were prepared using PVDM prepared according to Example 60j and blended with PMMA using the method according to Examples 88–90 using the Berstorff extruder, except that the zones were sequentially set at 10° C., 130° C., 150° C., 180° C., 180° C., 180° C., 180° C., 185° C., 195° C., 200° C., and 205° C., with 205° C. in the melt pump.

All measurements were made on a Perkin Elmer Lambda 19 Spectrophotometer with RSA-19a integrating sphere accessory. ASTM method D1003 was applied as follows: (1) The calculation was performed according to Procedure B of ASTM method D1003; and (2) A wavelength range of 780 nm to 380 nm at 5 nm intervals was chosen for compatibility with available luminosity tables. (ASTM method D1003 allowed user-defined wavelength range, and 380 to 780 nm is one of the ranges recommended in ASTM method E308). Other instrument parameters for ASTM method E308 are shown in Table 37.

Table 36 shows the results that this blend of the invention is nearly 97% clear.

TABLE 36

| EXAMPLE | COMPOSITION | % HAZE* | THICKNESS |
|---|---|---|---|
| Comp. 152a | 100% PMMA Unblended | 0.45% | 0.40 mm |
| Comp. 152b | 100% PMMA Unblended | 0.46% | 0.34 mm |
| 153a | 95% PMMA/5% PVDM Blend | 3.07% | 0.37 mm |
| 153b | 95% PMMA/5% PVDM Blend | 2.62% | 0.36 mm |

*Percent haze was reported to two decimal places, but the variance in sample thickness and measurement errors make precision of these measurements about +/− 0.05%.

Color data are reported in Table 37 below. The color data were calculated form total (diffuse) transmission data. Tristimulus and chromaticity values described the color through wavelength range 380 nm to 780 nm at spectral intervals every 5 nm using observer angles 2 degrees and 10 degrees and Illuminant CIE A. Table 37 shows how little difference in color exists between unblended PMMA and an azlactone-functional blend of the present invention.

TABLE 37

| | COMPARISON EXAMPLE 154 (100% PMMA Unblended) | | | EXAMPLE 155 (95% PMMA/5% PVDM Blend) | | |
|---|---|---|---|---|---|---|
| | Observer Angle: 2 degrees Illuminant CIE A | | | | | |
| Tristimulus: | X = 1.01536 | Y = 0.92403 | Z = 0.328218 | X = 1.00243 | Y = 0.911103 | Z = 0.315998 |
| Chromaticity: | x = 0.447767 | y = 0.407491 | z = 0.144742 | x = 0.449616 | y = 0.408651 | z = 0.141732 |
| | Observer Angle: 2 degrees Illuminant CIE C | | | | | |
| Tristimulus: | X = 0.905924 | Y = 0.923844 | Z = 1.08955 | X = 0.8896 | Y = 0.909339 | Z = 1.04584 |
| Chromaticity: | x = 0.310319 | y = 0.316458 | z = 0.373222 | x = 0.312712 | y = 0.319651 | z = 0.367636 |

TABLE 37-continued

| | COMPARISON EXAMPLE 154<br>(100% PMMA Unblended) | | | | EXAMPLE 155<br>(95% PMMA/5% PVDM Blend) | | |
|---|---|---|---|---|---|---|---|
| | | | Observer Angle: 10 degrees<br>Illuminant CIE A | | | | |
| Tristimulus: | X = 1.02727 | Y = 0.923991 | Z = 0.324664 | X = 1.01392 | Y = 0.910639 | Z = 0.31206 | |
| Chromaticity: | x = 0.451365 | y = 0.405983 | z = 0.142651 | x = 0.453328 | y = 0.407149 | z = 0.139523 | |
| | | | Observer Angle: 10 degrees<br>Illuminant CIE C | | | | |
| Tristimulus: | X = 0.898629 | Y = 0.923752 | Z = 1.07034 | X = 0.882004 | Y = 0.90817 | Z = 1.0259 | |
| Chromaticity: | x = 0.310651 | y = 0.319336 | z = 0.370011 | x = 0.313203 | y = 0.322494 | z = 0.364302 | |

While embodiments of the invention have been described, the invention is not limited thereto. The claims of the invention follow.

What is claimed is:

1. A molded article, comprising:
a thermoplastic composition molded into the article by a molding technique wherein the thermoplastic composition comprises a blend of an azlactone-functional homopolymer and a thermoplastic polymer, wherein azlactone-functional surfaces of the molded article have azlactone-reactive ligands coupled thereto.

2. An adduct molded article comprising a molded article comprising a thermoplastic composition of a blend of an azlactone functional homopolymer and a thermoplastic polymer and ligand comprising a biologically active substance having azlactone-reactive, nucleophilic-functional groups.

3. The adduct molded article according to claim 2, wherein the biologically active substance is biologically, immunochemically, physiologically, or pharmaceutically active.

4. The adduct molded article according to claim 3, wherein the biologically active substance comprises proteins, peptides, polypeptides, antibodies, antigenic substances, enzymes, cofactors, inhibitors, lectins, hormones, receptors, coagulation factors, amino acids, histones, vitamins, drugs, cell surface markers, or substances which interact with them.

5. The adduct molded article according to claim 4, wherein the biologically active substance comprises natural and recombinant Protein A, Immunoglobulins, Concanavalin A, Bovine Serum Albumin, Thyroglobulin, Apoferritin, Lysozyme, Carbonic Anhydrase, Lipase, Pig Liver Esterase, Penicillin acylase, or Bacterial Antigen.

* * * * *